US012804450B2

(12) United States Patent
Kim

(10) Patent No.: US 12,804,450 B2
(45) Date of Patent: Nov. 17, 2026

(54) METHOD AND APPARATUS FOR REPORTING DATA STATUS IN MOBILE WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(73) Assignees: BLACKPIN INC., Seoul (KR); Soenghun Kim, Gyeonggi-do (KR)

(*) Notice: Subject to any disclaimer, the term of this patent is extended or adjusted under 35 U.S.C. 154(b) by 112 days.

(21) Appl. No.: 18/926,554

(22) Filed: Oct. 25, 2024

(65) Prior Publication Data

US 2025/0168689 A1 May 22, 2025

(30) Foreign Application Priority Data

Nov. 16, 2023 (KR) .......................... 1020230159272

(51) Int. Cl.
*H04W 28/02* (2009.01)

(52) U.S. Cl.
CPC .................. *H04W 28/0236* (2013.01); *H04W 28/0278* (2013.01)

(58) Field of Classification Search
CPC ............. H04L 41/0806; H04L 41/0816; H04L 63/08; H04L 63/0823; H04L 63/0876; H04L 63/101; H04L 63/102; H04L 63/1425; H04L 63/20; H04L 67/12; H04L 67/125; H04L 67/141; H04L 67/34; H04W 12/04; H04W 12/06; H04W 12/069;

(Continued)

(56) References Cited

U.S. PATENT DOCUMENTS

| | | | | |
|---|---|---|---|---|
| 2018/0092118 A1* | 3/2018 | Kim | ...................... | H04W 72/12 |
| 2019/0357245 A1* | 11/2019 | Kuang | .................. | H04L 5/0094 |
| 2020/0236582 A1* | 7/2020 | Chin | ..................... | H04W 72/23 |
| 2020/0305181 A1* | 9/2020 | Yue | ....................... | H04L 5/0053 |

(Continued)

OTHER PUBLICATIONS

3GPP, "TSG-RAN WG2 Meeting #124 R2-2311903", Chicago, USA, Nov. 13-17, 2023, 5 pages.

(Continued)

*Primary Examiner* — Christopher Biagini
(74) *Attorney, Agent, or Firm* — Nicholas Park

(57) ABSTRACT

A method and apparatus to support XR services is provided. Method for supporting XR services includes triggering a delay status report (DSR) for a one or more logical channels, triggering a scheduling request (SR) in case that uplink resource available for new transmission is not enough to accommodate the DSR medium access control (MAC) control element (CE) and its subheader as a result of logical channel prioritization, transmitting the SR based on SR configuration, starting a prohibit timer for the SR, and stopping the prohibit timer for the SR in case that a specific delay-critical data is transmitted. The specific delay-critical data is a delay-critical data that has not been transmitted. The delay-critical data comprises packet data convergence protocol (PDCP) Service Data Units (SDUs) that belongs to a Protocol Data Unit (PDU) set of which at least one PDCP SDU has the remaining time till expiry of a discard timer less than a remaining time threshold. The discard timer starts for a PDCP SDU when the PDCP SDU arrives at PDCP entity. The remaining time threshold is configured based on a radio resource control message.

12 Claims, 20 Drawing Sheets

(58) Field of Classification Search
CPC ....... H04W 12/08; H04W 12/50; H04W 4/50; H04W 4/70; H04W 48/18; H04W 76/10; H04W 8/005
See application file for complete search history.

(56) References Cited

U.S. PATENT DOCUMENTS

| | | | | |
|---|---|---|---|---|
| 2021/0013949 | A1* | 1/2021 | Agiwal | H04W 28/0278 |
| 2021/0051694 | A1* | 2/2021 | Shi | H04W 72/00 |
| 2022/0095325 | A1* | 3/2022 | Kumar | H04W 72/52 |
| 2024/0080833 | A1* | 3/2024 | Jeon | H04W 74/0833 |
| 2025/0193721 | A1* | 6/2025 | He | H04W 24/08 |
| 2025/0317958 | A1* | 10/2025 | Kanamarlapudi | H04W 28/0278 |

OTHER PUBLICATIONS

3GPP, “TSG-RAN WG2 Meeting #124 R2-2312603”, Chicago, USA, Nov. 13-17, 2023, 1235 pages.
3GPP, “TSG-RAN WG2 Meeting #124 R2-2311771”, Chicago, USA, Nov. 13-17, 2023, 3 pages.
3GPP, “TSG-RAN WG2 Meeting #124 R2-2311949”, Chicago, USA, Nov. 13-17, 2023, 3 pages.
3GPP, “TSG-RAN WG2 Meeting #124 R2-2313460”, Chicago, USA, Nov. 13-17, 2023, 4 pages.
3GPP, “TSG-RAN WG2 Meeting #124 R2-2313588”, Chicago, USA, Nov. 13-17, 2023, 45 pages.
3GPP, “TSG-RAN WG2 Meeting #124 R2-2313560 Revision of R2-231770”, Chicago, USA, Nov. 13-17, 2023, 5 pages.

* cited by examiner

R/F/LCID/(eLCID)/L MAC subheader with 8-bit L field
3E10

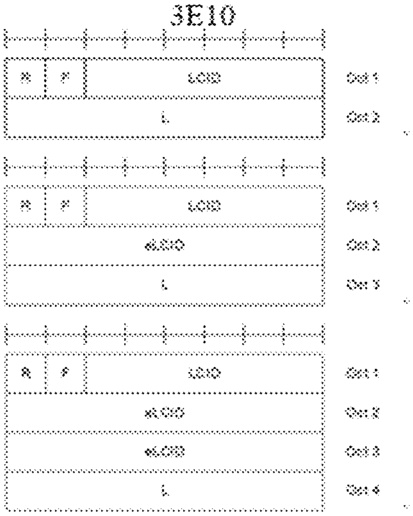

R/F/LCID/(eLCID)/L MAC subheader with 16-bit L field
3E20

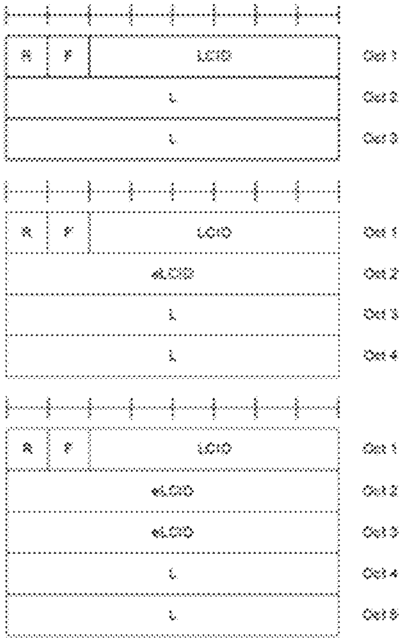

(LX)/R/LCID/(eLCID) MAC subheader
3E30

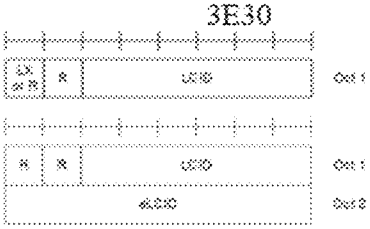

3E40

| Codepoint | Index | LCID values |
|---|---|---|
| 0 | $(2^{16} + 320)$ | CCCH of size 48 bits for an eRedCap UE |
| 1 | $(2^{16} + 321)$ | CCCH of size 64 bits for an eRedCap UE |
| 2 | $(2^{16} + 322)$ | CCCH of size 48 bits for PUCCH repetition of Msg4 HARQ-ACK, except for an (e)RedCap UE |
| 3 | $(2^{16} + 323)$ | CCCH of size 64 bits for PUCCH repetition of Msg4 HARQ-ACK, except for an (e)RedCap UE |
| 4 | $(2^{16} + 324)$ | CCCH of size 48 bits for PUCCH repetition of Msg4 HARQ-ACK of a RedCap UE |
| 5 | $(2^{16} + 325)$ | CCCH of size 64 bits for PUCCH repetition of Msg4 HARQ-ACK of a RedCap UE |
| 6 | $(2^{16} + 326)$ | CCCH of size 48 bits for PUCCH repetition of Msg4 HARQ-ACK of an eRedCap UE |
| 7 | $(2^{16} + 327)$ | CCCH of size 64 bits for PUCCH repetition of Msg4 HARQ-ACK of an eRedCap UE |
| 8 to 83 | $(2^{16} + 328)$ to $(2^{16} + 363)$ | Reserved |

FIG.3E

METHOD AND APPARATUS FOR REPORTING DATA STATUS IN MOBILE WIRELESS COMMUNICATION SYSTEM

CROSS-REFERENCE TO RELATED APPLICATION

This application claims priority to and the benefit of Korean Patent Application No. 10-2023-0159272, filed on Nov. 16, 2023, which is hereby incorporated herein by reference in its entirety.

BACKGROUND

Technical Field

The present disclosure relates to enhanced data status reporting for extended reality in a mobile communication system. More specifically, the present disclosure relates to buffer status reporting and delay status reporting.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability.

Extended Reality (XR) refers to all real-and-virtual combined environments and human-machine interactions generated by computer technology and wearables. XR is an umbrella term for different types of realities.

During a XR service, huge amount of Data Bursts may be generated and transmitted over NR downlink and uplink. Data Burst of XR services often have stringent delay budget. It requires more sophisticated uplink scheduling technique to achieve timely scheduling and to avoid excessive resource waste.

SUMMARY

Aspects of the present disclosure are to address the problems of XR traffic handling. The method includes triggering a delay status report (DSR) for a one or more logical channels, triggering a scheduling request (SR) in case that uplink resource available for new transmission is not enough to accommodate the DSR medium access control (MAC) control element (CE) and its subheader as a result of logical channel prioritization, transmitting the SR based on SR configuration, starting a prohibit timer for the SR, and stopping the prohibit timer for the SR in case that a specific delay-critical data is transmitted. The specific delay-critical data is a delay-critical data that has not been transmitted. The delay-critical data comprises packet data convergence protocol (PDCP) Service Data Units (SDUs) that belongs to a Protocol Data Unit (PDU) set of which at least one PDCP SDU has the remaining time till expiry of a discard timer less than a remaining time threshold. The discard timer starts for a PDCP SDU when the PDCP SDU arrives at PDCP entity. The remaining time threshold is configured based on a radio resource control message.

BRIEF DESCRIPTION OF THE DRAWINGS

FIG. 3E illustrates MAC subheader format.

DETAILED DESCRIPTION

In the rapidly evolving landscape of wireless communication, Extended Reality (XR) applications, encompassing Augmented Reality (AR), Virtual Reality (VR), and Mixed Reality (MR), demand superior data handling capabilities to deliver seamless user experiences. The Buffer Status Reporting (BSR) mechanism in the MAC layer plays a pivotal role in ensuring efficient data transmission by reporting the status of buffers at the user equipment (UE) to the network. However, the traditional BSR mechanisms face challenges in meeting the low latency requirements critical for XR applications.

The present disclosure focuses on mitigating latency issues and ensuring robust connectivity, thereby enabling a seamless and responsive XR experience based on a new mechanism to report delay sensitive data to the base station. This solution aims to enhance data throughput, reduce latency, and improve overall network performance, thereby providing a more immersive and responsive XR experience.

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the present disclosure, "trigger" or "triggered" and "initiate" or "initiated" can be used interchangeably.

In the present disclosure, UE and terminal and wireless device can be used interchangeably. In the present disclosure, NG-RAN node and base station and GNB can be used interchangeably.

Figure 1A:
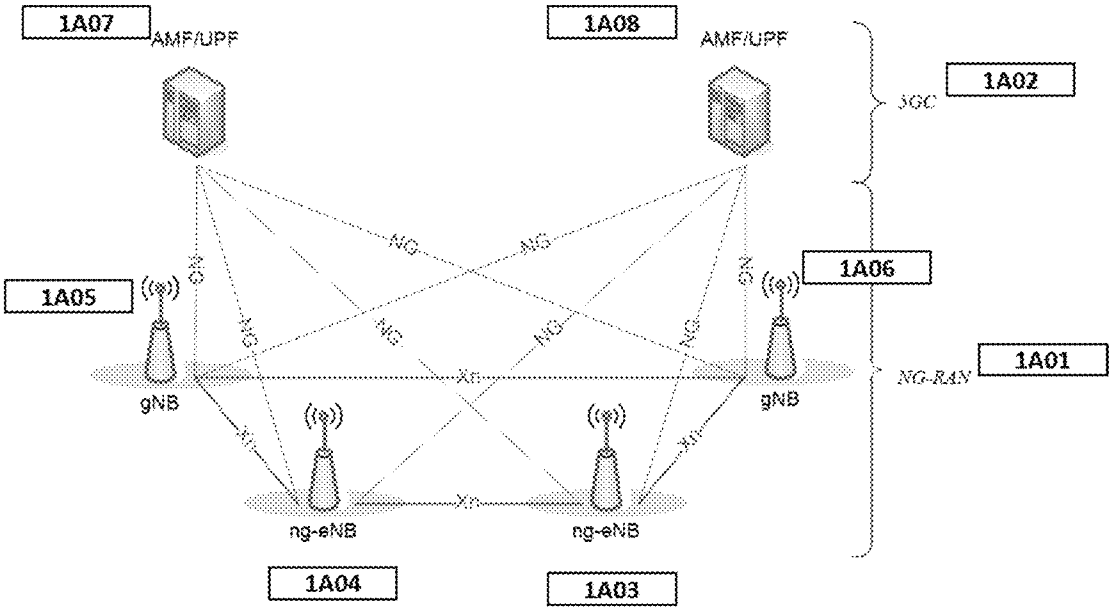
FIG. 1A is a diagram illustrating the architecture of an 5G system and a NG-RAN.

FIG. 1A is a diagram illustrating the architecture of an 5G system and a NG-RAN to which the disclosure may be applied.

5G system consists of NG-RAN 1A01 and 5GC 1A02. An NG-RAN node is either:

>1: a gNB, providing NR user plane and control plane protocol terminations towards the UE; or >1: an ng-eNB, providing E-UTRA user plane and control plane protocol terminations towards the UE.

The gNBs 1A05 or 1A06 and ng-eNBs 1A03 or 1A04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A07 and UPF 1A08 may be realized as a physical node or as separate physical nodes.

A gNB 1A05 or 1A06 or an ng-eNBs 1A03 or 1A04 hosts the various functions listed below.

>1: Functions for Radio Resource Management such as Radio Bearer Control, Radio Admission Control, Connection Mobility Control, Dynamic allocation of resources to UEs in uplink, downlink and sidelink (scheduling); and >1: IP and Ethernet header compression, uplink data decompression and encryption of user data stream; and >1: Selection of an AMF at UE attachment when no routing to an MME can be determined from the information provided by the UE; and >1: Routing of User Plane data towards UPF; and >1: Scheduling and transmission of paging messages; and >1: Scheduling and transmission of broadcast information (originated from the AMF or O&M); and >1: Measurement and measurement reporting configuration for mobility and scheduling; and >1: Session Management; and >1: QOS Flow management and mapping to data radio bearers; and >1: Support of UEs in RRC_INACTIVE state; and The AMF 1A07 hosts the functions such as NAS signaling, NAS signaling security, AS security control, SMF selection, Authentication, Mobility management and positioning management.

The UPF 1A08 hosts the functions such as packet routing and forwarding, transport level packet marking in the uplink, QoS handling and the downlink, mobility anchoring for mobility etc.

Figure 1B:
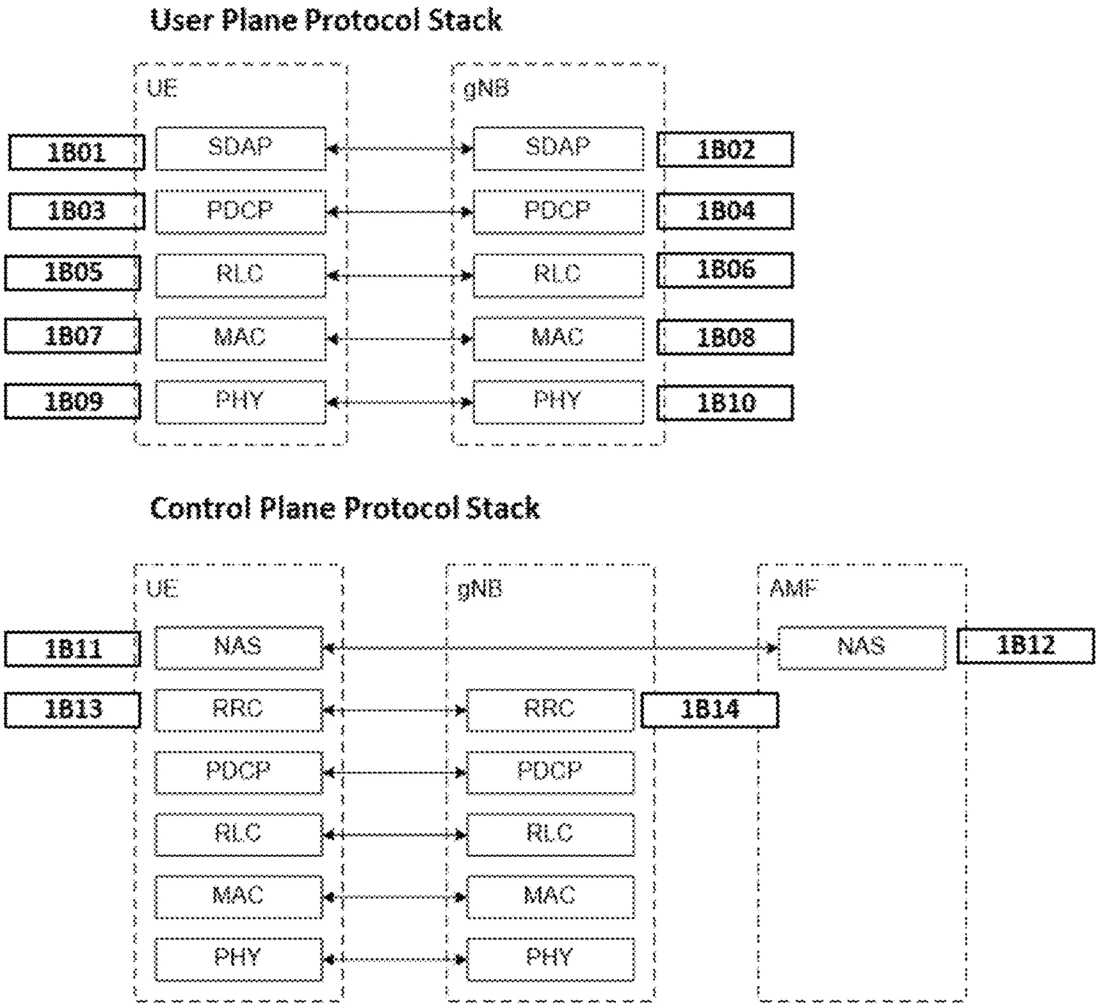
FIG. 1B is a diagram illustrating a wireless protocol architecture in an 5G system.

FIG. 1B is a diagram illustrating a wireless protocol architecture in an 5G system to which the disclosure may be applied.

User plane protocol stack consists of SDAP 1B01 or 1B02, PDCP 1B03 or 1B04, RLC 1B05 or 1B06, MAC 1B07 or 1B08 and PHY 1B09 or 1B10. Control plane protocol stack consists of NAS 1B11 or 1B12, RRC 1B13 or 1B14, PDCP, RLC, MAC and PHY.

Each protocol sublayer performs functions related to the operations listed below.

NAS: authentication, mobility management, security control etc

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping g between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Figure 2A:
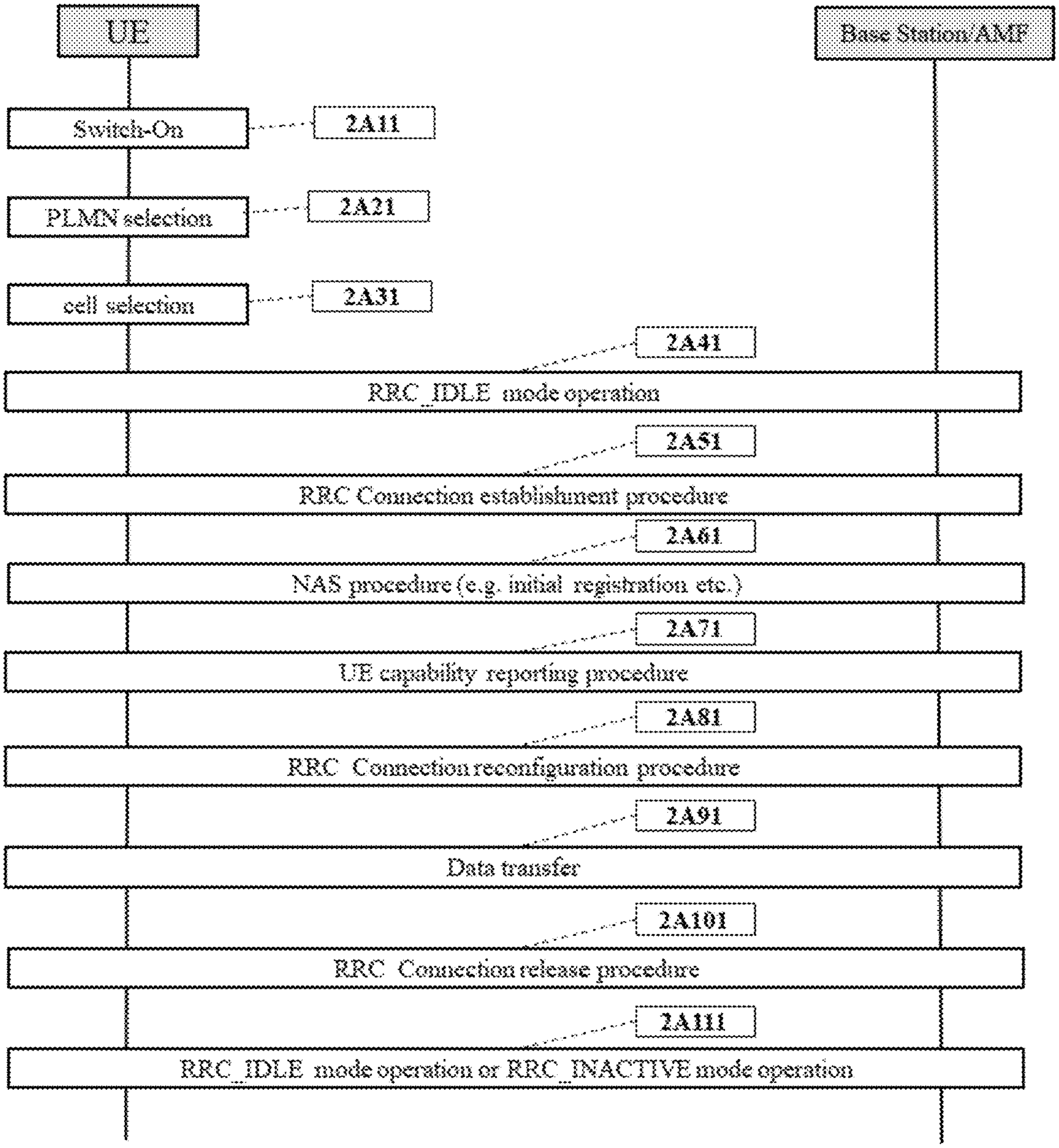
FIG. 2A illustrates overall operation of the UE and network.

FIG. 2A illustrates overall operation of the UE and network.

Upon switch-on of the wireless device (e.g. UE) 2A11, UE performs PLMN selection 2A21 to select the carrier that is provided by the PLMN that UE is allowed to register.

Then UE performs cell selection 2A31 to camp on a suitable cell.

Once camping on a suitable cell, UE performs RRC_IDLE mode operation 2A41 such as paging channel monitoring and cell reselection and system information acquisition.

UE performs RRC Connection establishment procedure 2A51 to perform e.g. NAS procedure such as initial registration with the selected PLMN.

After successful RRC connection establishment, UE performs NAS procedure 2A61 by transmitting a corresponding NAS message via the established RRC connection (e.g. SRB1).

The base station can trigger UE capability reporting procedure 2A71 before configuring data bearers and various MAC functions.

The base station and the UE perform RRC connection reconfiguration procedure 2A81. Via the procedure, data radio bearers and logical channels and various MAC functions (such as DRX and BSR and PHR and beam failure reporting etc) and various RRC functions (such as RRM and RLM and measurement etc) are configured.

The base station and the UE perform data transfer 2A91 via the established radio bearers and based on configured MAC functions and configured RRC functions.

If geographical location of UE changes such that e.g. the current serving cell is no longer providing suitable radio condition, the base station and the UE perform cell level mobility such as handover or conditional reconfiguration or lower layer triggered mobility.

When RRC connection is not longer needed for the UE because of e.g. no more traffic available for the UE, the base station and the UE performs RRC connection release procedure 2A101. The base station can transit UE state either to RRC_IDLE (if the data activity of the UE is expected low) or to RRC_INACTIVE (if the data activity of the UE is expected high).

The UE performs either RRC_IDLE operation or RRC_INACTIVE mode operation 2A111 until the next event to RRC connection establishment/resumption occurs.

Figure 2B:
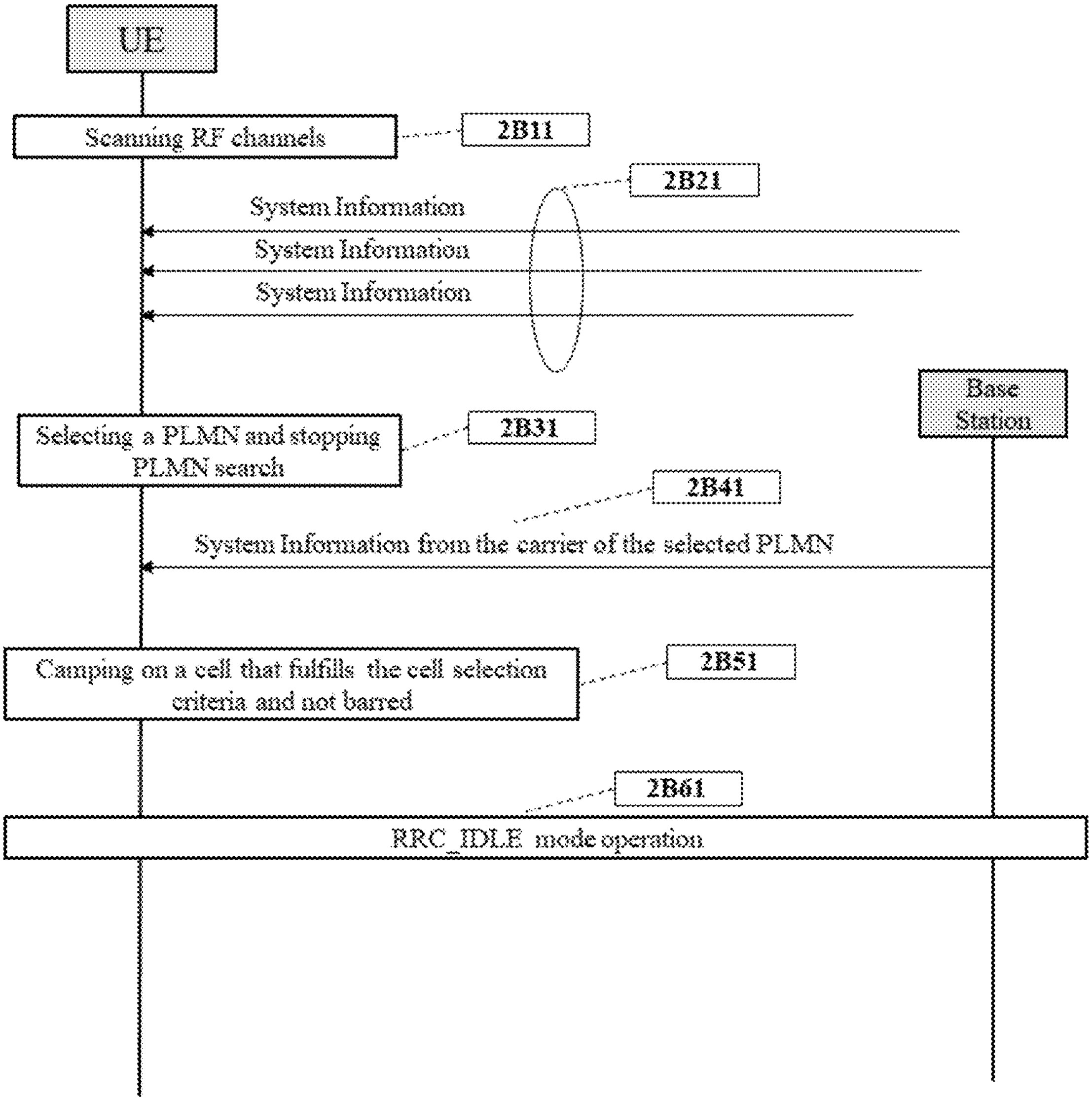
FIG. 2B illustrates the operation of the UE regarding PLMN selection and cell selection and cell reselection.

FIG. 2B illustrates the operation of the UE regarding PLMN selection and cell selection and cell reselection.

For PLMN selection, the UE may scan all RF channels to find available PLMNs 2B11. On each carrier, the UE shall search for the strongest cell and read its system information 2B21, in order to find out which PLMN(s) the cell belongs to. Each found PLMN is considered as a high quality PLMN (but without the RSRP value) provided that the measured RSRP value is greater than or equal to −110 dBm.

The search for PLMNs may be stopped when the PLMN to which the UE can register is found 2B31.

Once the UE has selected a PLMN, the cell selection procedure shall be performed in order to select a suitable cell of that PLMN to camp on.

The UE performs measurement on detectable cells and receives system information from whichever detectable cells that system information is readable 2B41.

The UE considers cell selection criterion S is fulfilled when:

Srxlev>0 AND

Squal>0 where, Srxlev is Cell selection RX level value (dB) and Squal is Cell selection quality value (dB). Srxlev is determined based on Measured cell RX level value (RSRP). Squal is determined based on Measured cell quality value (RSRQ).

The UE selects the cell that is part of the selected PLMN, and for which cell selection criteria are fulfilled, and of which cell access is not barred 2B51.

The UE camps on the selected cell. The UE performs RRC_IDLE mode operation 2B61 such as monitoring control channels to receive system information and paging and notification message.

Figure 2C:
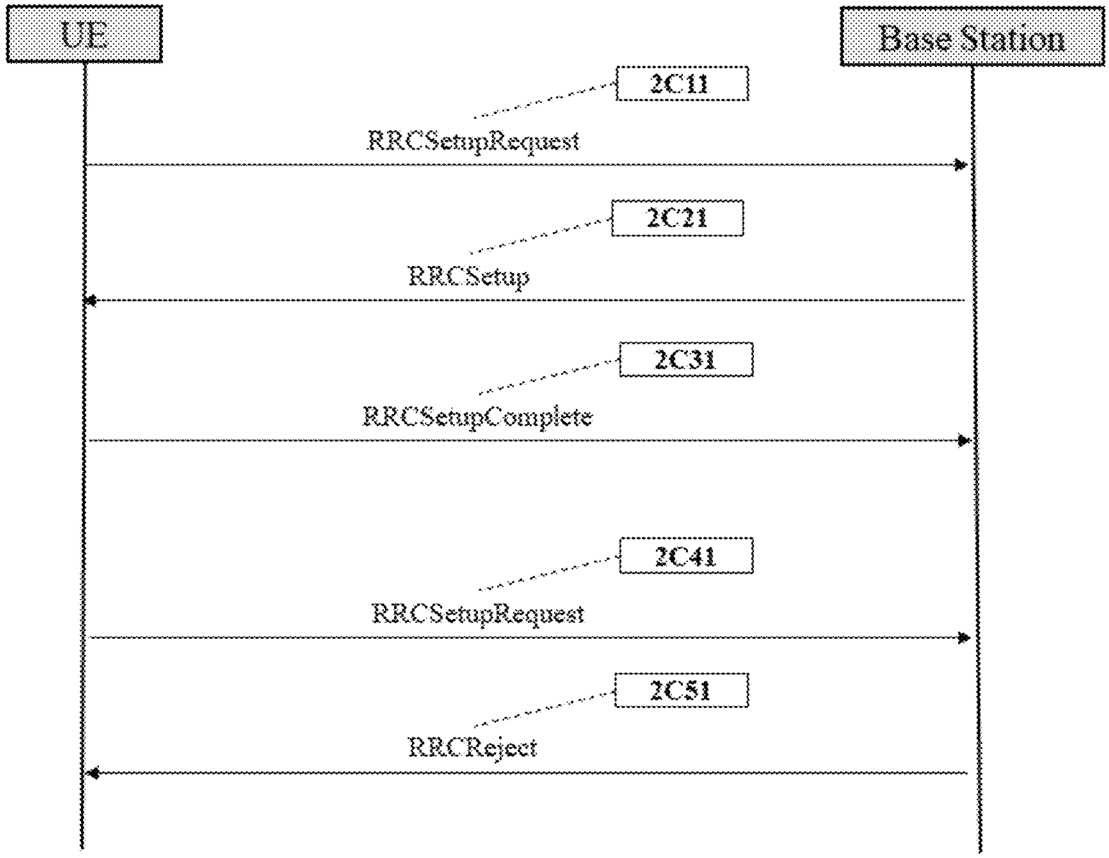
FIG. 2C illustrates RRC connection establishment procedure.

FIG. 2C illustrates RRC connection establishment procedure.

Successful RRC connection establishment procedure comprises:

>1: transmission of RRCSetupRequest by the UE 2C11;
>1: reception of RRCSetup by the UE 2C21;
>1: transmission of RRCSetupComplete by the UE 2C31.

Unsuccessful RRC connection establishment procedure comprises:

>1: transmission of RRCSetupRequest by the UE 2C41;
>1: reception of RRCReject by the UE 2C51;

RRCSetupRequest comprises following fields and IEs:

>1: ue-Identity field contains InitialUE-Identity IE which contains:
>>2: ng-5G-S-TMSI-Part1 field containing a BIT STRING of 39 bit;
>1: establishmentCause field contains EstablishmentCause IE which contains:
>>2 enumerated value indicating either emergency, highPriorityAccess, mt-Access, mo-Signalling, mo-Data, mo-VoiceCall, mo-VideoCall, mo-SMS, mps-PriorityAccess, mcs-Priority Access etc RRCSetup comprises following fields and IEs:

>1: radioBearerConfig field containing a RadioBearerConfig IE;
>1: masterCellGroup field containing a CellGroupConfig IE.

RRCSetupComplete comprises following fields and IEs:

>1: selectedPLMN-Identity field containing an integer indicating selected PLMN;
>1: dedicatedNAS-Message field containing a DedicatedNAS-Message which may contain various NAS message;
>1: ng-5G-S-TMSI-Part2 field containing a BIT STRING of 9 bit.

RRCSetupRequest is transmitted via CCCH/SRB0, which means that the base station does not identify UE transmitting the message based on DCI that scheduling the uplink transmission. The UE includes a field (ue-Identity) in the message so that the base station identify the UE. If 5G-S-TMSI is available (e.g. UE has already registered to a PLMN), the UE sets the field with part of the 5G-S-TMSI. If 5G-S-TMSI is not available (e.g. UE has not registered to any PLMN), the UE sets the field with 39-bit random value.

Upon reception of RRCSetup, UE configures cell group and SRB1 based on the configuration information in the RRCSetup. The UE perform following actions:

>1: perform the cell group configuration procedure in accordance with the received masterCellGroup;
>1: perform the radio bearer configuration procedure in accordance with the received radioBearerConfig;
>1: if stored, discard the cell reselection priority information provided by the cellReselectionPriorities or inherited from another RAT;
>1: enter RRC_CONNECTED;
>1: stop the cell re-selection procedure;
>1: consider the current cell to be the PCell;

The UE transmits to the base station RRCSetupComplete after performing above actions.

Figure 2D:
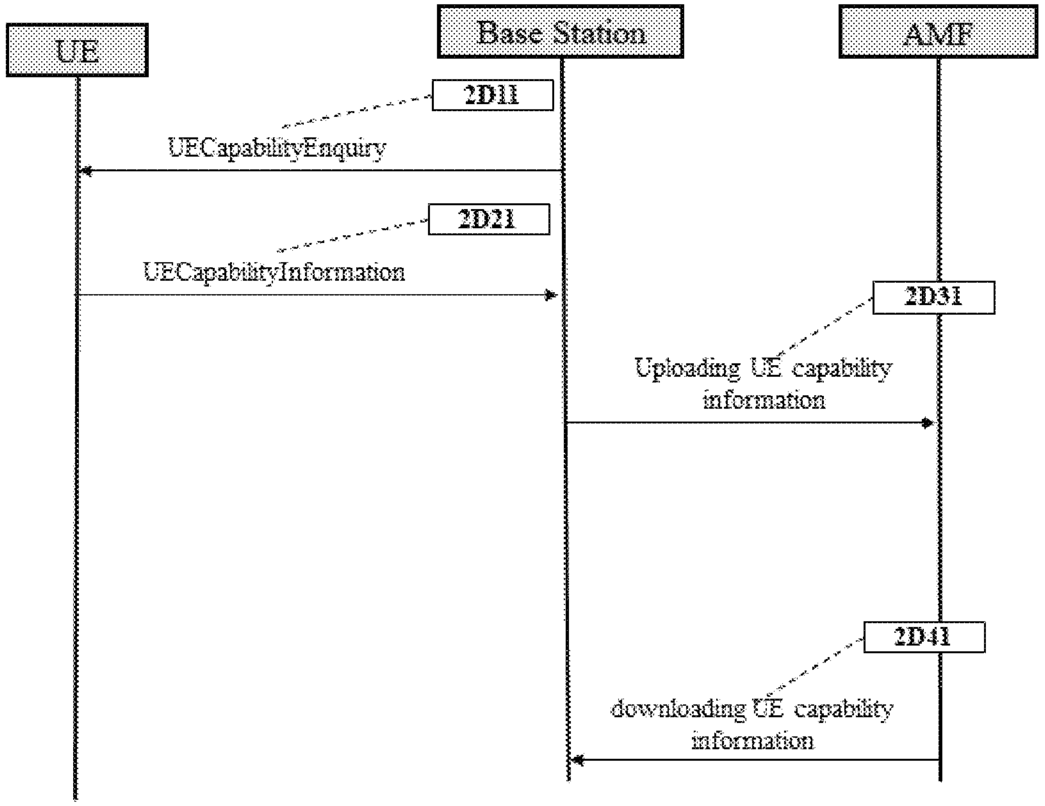
FIG. 2D illustrates UE capability transfer procedure.

The UE sets the contents of RRCSetupComplete message as follows:

>1: set the ng-5G-S-TMSI-Value to ng-5G-S-TMSI-Part2;
>1: set the selectedPLMN-Identity to the PLMN selected by upper layers from the plmn-IdentityInfoList;
>1: include the s-NSSAI-List and set the content to the values provided by the upper layers;

FIG. 2D illustrates UE capability transfer procedure.

For network to configure the UE with appropriate configurations, the network needs to know the capability of the UE. For this end, the UE and the base station perform UE capability transfer procedure.

UE capability transfer procedure consists of exchanging UECapabilityEnquiry 2D11 and UECapabilityInformation 2D21 between the UE and the base station.

In the UECapabiliityEnquiry, the base station indicates which RAT is subject to capability reporting. UE transmits the capability information for the requested RAT in the UECapability Information.

Once UECapabilityInformation is received, the capability information is uploaded to the AMF by the base station 2D31. When UE capability information is needed afterward, AMF provide it to the base station 2D41.

Figure 2E:
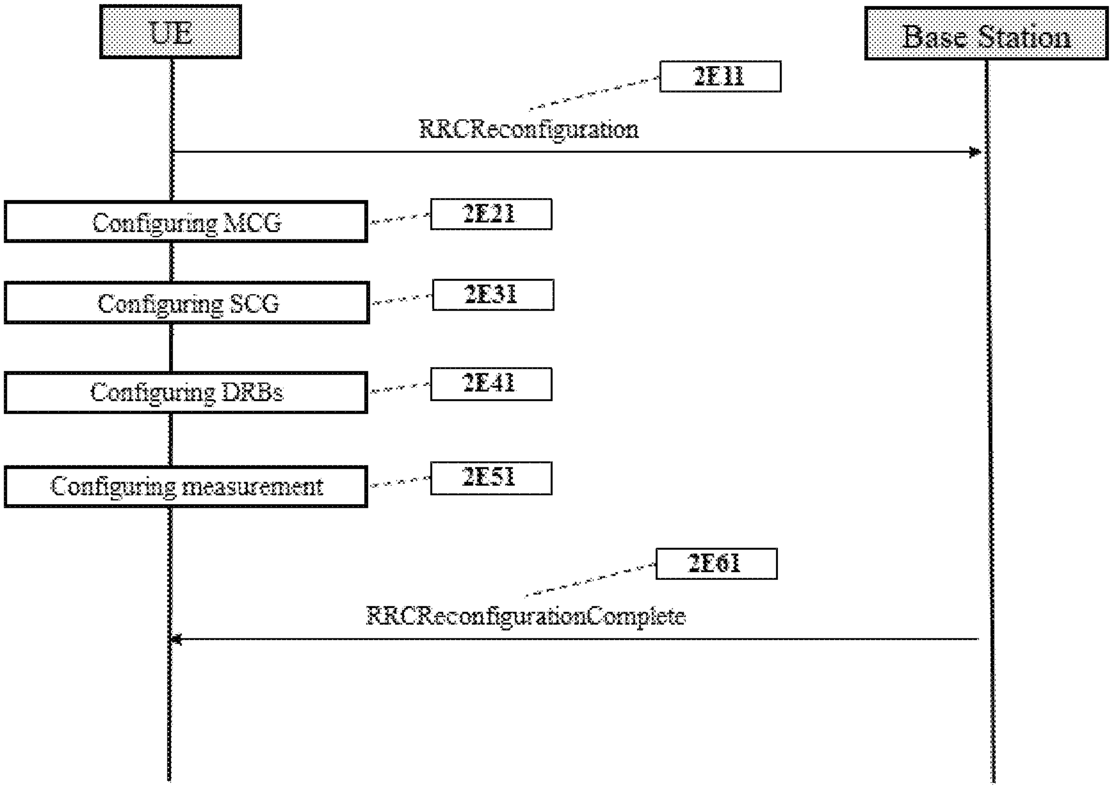
FIG. 2E illustrates RRC connection reconfiguration procedure.

FIG. 2E illustrates RRC connection reconfiguration procedure.

Based on the reported capability and other factors such as required QoS and call admission control etc, the base station performs RRC reconfiguration procedure with the UE.

RRC reconfiguration procedure is a general purposed procedure that is applied to various use cases such as data radio bearer establishment, handover, cell group reconfiguration, DRX configuration, security key refresh and many others.

RRC reconfiguration procedure consists of exchanging RRCReconfiguration 2E11 and RRCReconfigurationComplete 2E61 between the base station and the UE.

RRCReconfiguration may comprise following fields and IEs:

>1: rrc-TransactionIdentifier field contains a RRC-TransactionIdentifier IE;

>1: radioBearerConfig field contains a RadioBearerConfig IE;

>>2: radioBearerConfig field comprises configuration information for SRBs and DRBs via which RRC messages and user traffic are transmitted and received;

>1: secondaryCellGroup field contains a CellGroupConfig IE;

>>2: secondaryCellGroup field comprises configuration information for secondary cell group;

>>2: A cell group consists of a SpCell and zero or more SCells;

>>2: Cell group configuration information comprises cell configuration information for SpCell/SCell and configuration information for MAC and configuration information for logical channel etc;

>1: measConfig field contains a MeasConfig IE;

>>2: measConfig field comprises configuration information for measurements that the UE is required to perform for mobility and other reasons.

>1: masterCellGroup field contains a CellGroupConfig IE;

Upon reception of RRCReconfiguration, UE processes the IEs in the order as below. UE may:

>1: perform the cell group configuration for MCG based on the received masterCellGroup 2E21;

>1: perform the cell group configuration for SCG based on the received secondaryCellGroup 2E31;

>1: perform the radio bearer configuration based on the received radioBearerConfig 2E41;

>1: perform the measurement configuration based on the received measConfig 2E51;

After performing configuration based on the received IEs/fields, the UE transmits the RRCReconfigurationComplete to the base station. To indicate that the RRCReconfigurationComplete is the response to RRCReconfiguration, UE sets the TransactionIdentifier field of the RRCReconfigurationComplete with the value indicated in TransactionIdentifier field of the RRCReconfiguration.

Figure 2F:
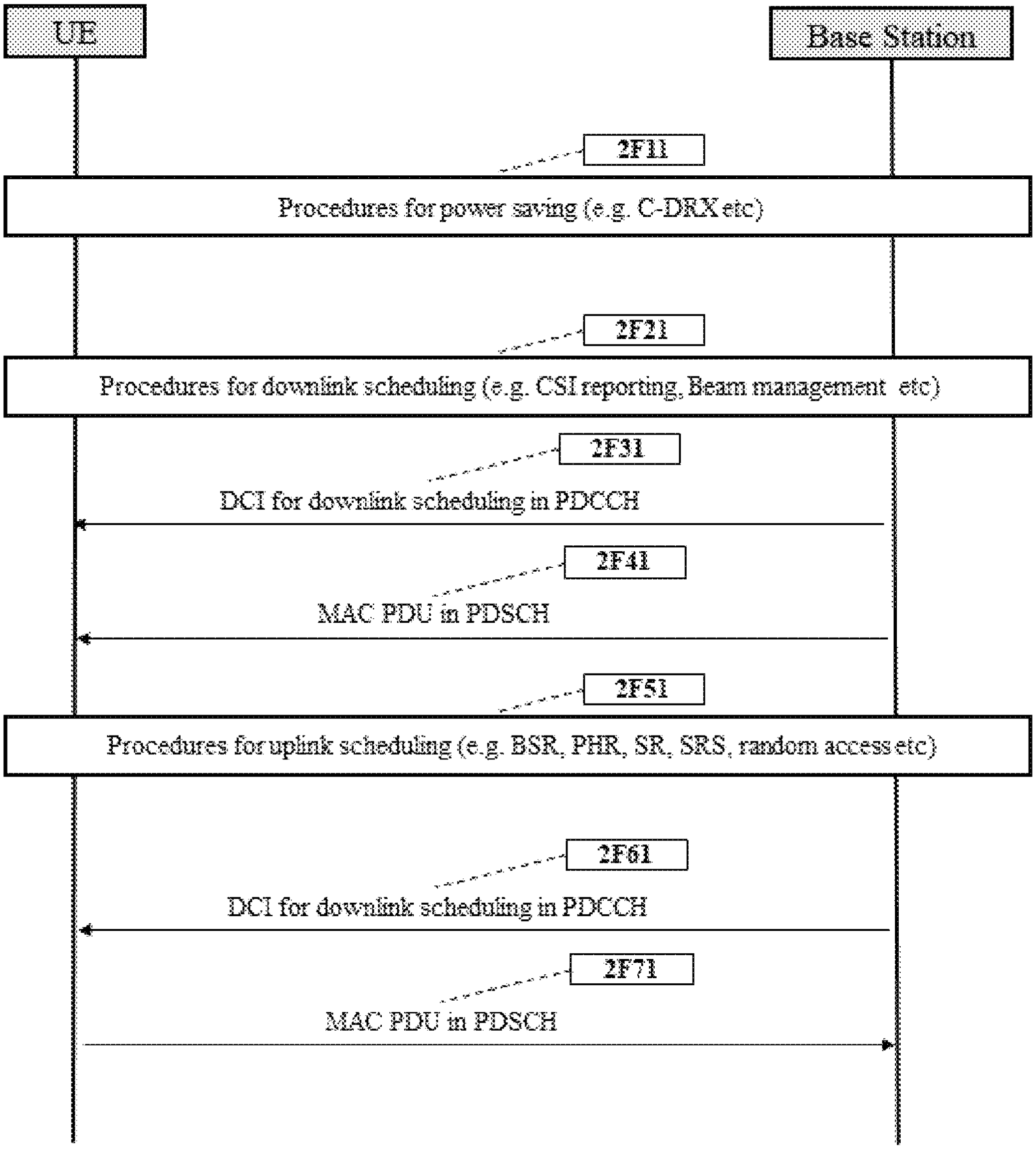
FIG. 2F illustrates data transfer procedure in RRC_CONNECTED state.

FIG. 2F illustrates data transfer procedure in RRC_CONNECTED state.

The UE and the base station may perform procedures for power saving such as C-DRX 2F11. The configuration information for C-DRX is provided to the UE within cell group configuration in the RRCReconfiguration.

The UE and the base station may perform various procedures for downlink scheduling 2F21 such as CSI reporting and beam management. The configuration information for CSI reporting is provided to the UE within cell group configuration in the RRCReconfiguration. Beam management is performed across RRC layer and MAC layer and PHY layer. Beam related information is configured via cell group configuration information within RRCReconfiguration. Activation and deactivation of beam is performed by specific MAC CEs.

Based on the reported CSI and downlink traffic for the UE, the base station determines the frequency/time resource and transmission format for downlink transmission. The base station transmits to the UE DCI containing downlink scheduling information via PDCCH 2F31. The base station transmits to the UE PDSCH corresponding to the DCI and containing a MAC PDU 2F41.

The UE and the base station may perform various procedure for uplink scheduling 2F51 such as buffer status reporting and power headroom reporting and scheduling request and random access. The configuration information for those procedures are provided to the UE in cell group configuration information in RRCReconfiguration.

Based on the uplink scheduling information reported by the UE, the base station determines the frequency/time resource and transmission format for uplink transmission. The base station transmits to the UE DCI containing uplink scheduling information via PDCCH 2F61. The base station transmits to the UE PDSCH corresponding to the DCI and containing a MAC PDU 2F71.

Figure 3A:
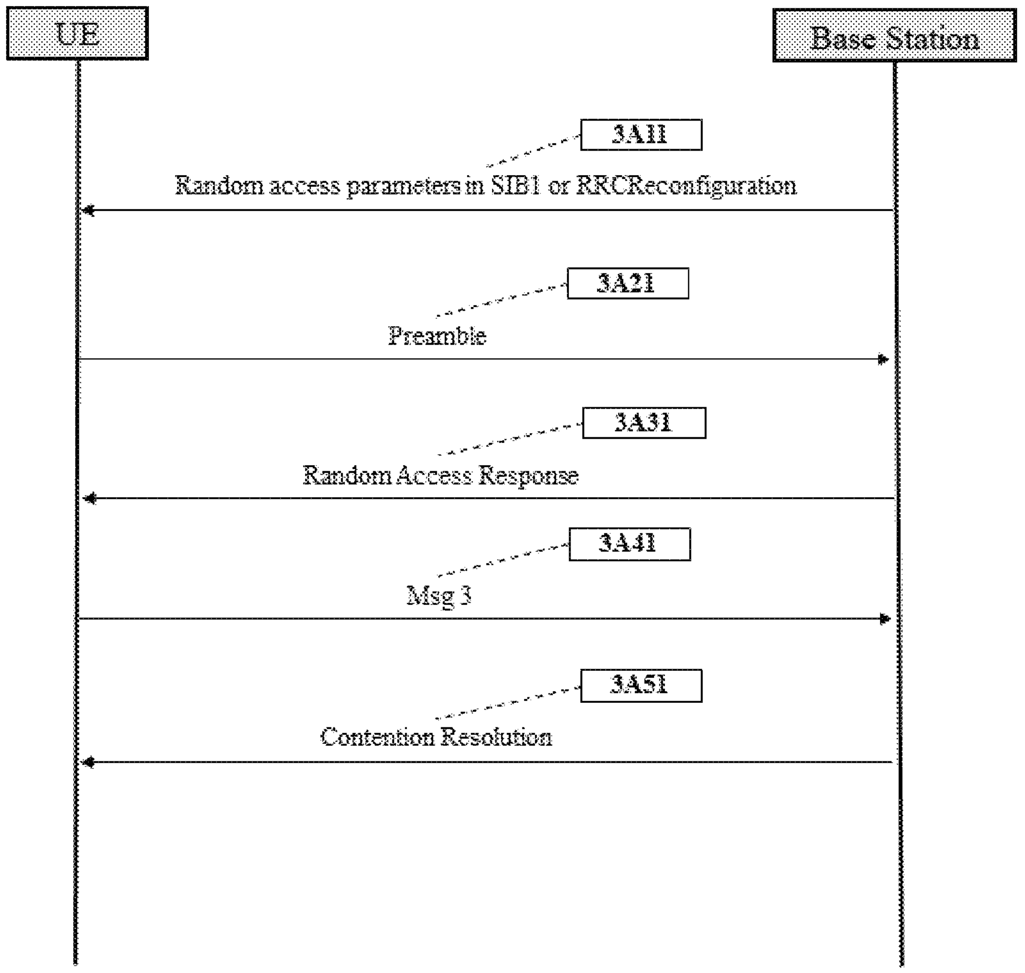
FIG. 3A illustrates random access procedure.

FIG. 3A illustrates random access procedure.

Random access procedure enables the UE to align uplink transmission timing, and indicate the best downlink beam, and transmit a MAC PDU that may contain CCCH SDU (e.g. RRCSetupRequest).

Random access procedure comprises preamble transmission 3A21, random access response reception 3A31, Msg 3 transmission 3A41 and contention resolution 3A51.

Parameters for random access procedure are provided in SIBI (in case of initial access) or in RRCReconfiguration (in case of handover) 3A11.

Random access procedure may be triggered by a number of events such as initial access from RRC_IDLE (e.g. RRC connection establishment procedure), DL or UL data arrival, request by RRC upon synchronous reconfiguration (e.g. handover) and RRC Connection Resume procedure from RRC_INACTIVE etc.

When the random access procedure is initiated, the UE may perform following actions in order:

>1: flush the buffer for Msg 3;

>1: initialize the counters for preamble transmission and power ramping;

>1: select the uplink carrier for performing the random access procedure based on a rsrp threshold (e.g. rsrp-ThresholdSSB-SUL);

>1: select the set of Random Access resources applicable to the current Random Access procedure;

>1: select a SSB based on a rsrp threshold (e.g. rsrp-ThresholdSSB); a SSB corresponds to a downlink beam;

>1: select a random access preamble group based on the pathloss of the selected SSB and the potential Msg3 size and various parameters (e.g. ra-Msg3SizeGroupA, preambleReceivedTargetPower, msg3-DeltaPreamble, messagePowerOffsetGroupB etc); Preamble group selection enables the UE to request bigger uplink grant for Msg 3 transmission if channel condition is good enough and the potential Msg 3 size is above a certain threshold;

>1: select a random access preamble randomly with equal probability from the random access preambles associated with the selected SSB and the selected random access preamble group;

>1: determine the next available PRACH occasion from the PRACH occasions corresponding to the selected SSB;

>1: determine the transmission power of the preamble;

>>2: preamble transmission power=pathloss+preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA >1: transmit the preamble in the determined PRACH occasion with the determined transmission power;

>1; start ra-Response Window;

>1: monitor the PDCCH of the SpCell for Random Access Response(s) identified by the RA-RNTI while the ra-Response Window is running;

>1: receive Random Access Response contains a MAC subPDU with Random Access Preamble identifier corresponding to the transmitted preamble;

>1: process the received Timing Advanced Command and the received UL grant;

>1: transmit a Msg 3 based on the received UL grant;

>>2: Msg 3 may contain e.g. CCCH SDU such as RRCSetupRequest or RRCResumeRequest;

>1: start ra-ContentionResolutionTimer;

>1: monitor the PDCCH while the ra-ContentionResolution Timer is running;

>1: consider Contention Resolution successful when MAC PDU containing a UE Contention Resolution Identity MAC CE is received;

>1: consider the Random Access procedure successfully completed.

Figure 3B:
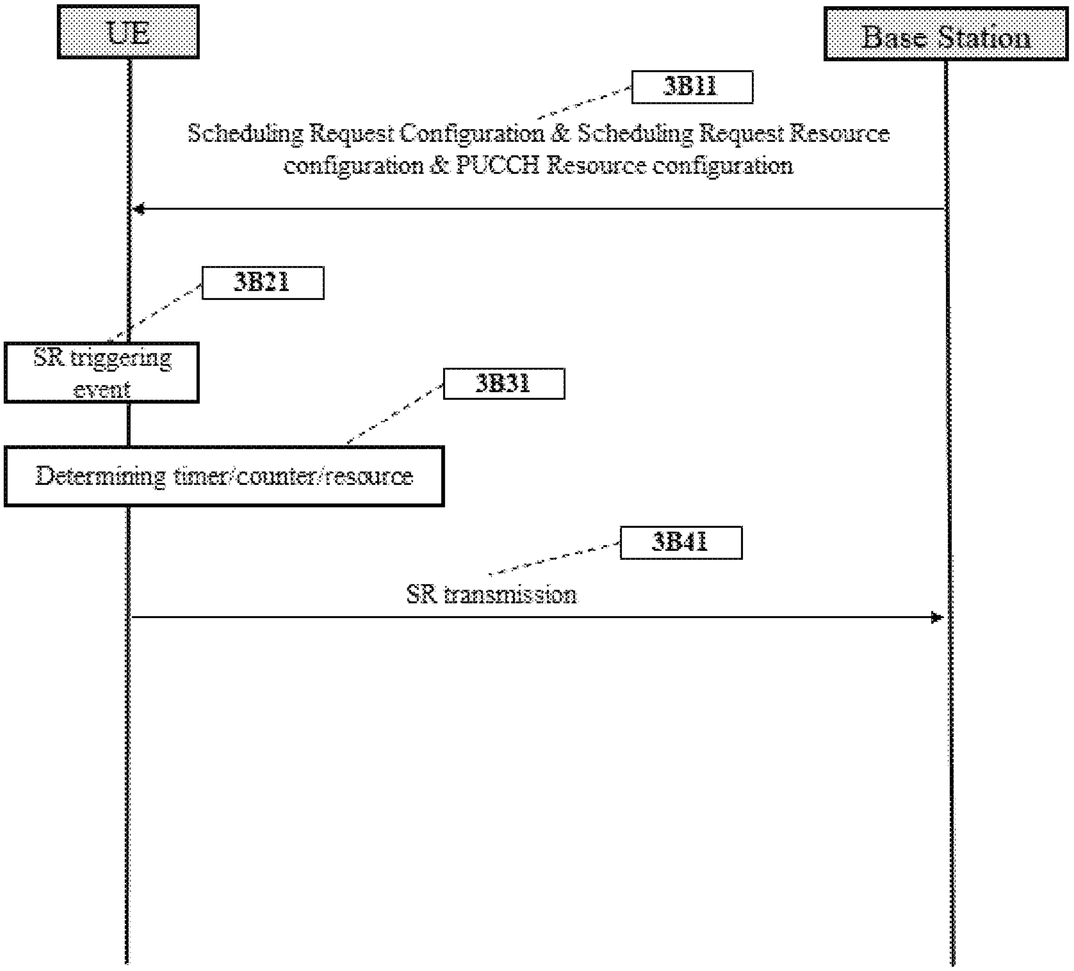
FIG. 3B illustrates scheduling request procedure based on dedicate scheduling request resource.

FIG. 3B illustrates scheduling request procedure based on dedicate scheduling request resource.

Unlike downlink traffic, the scheduler in the base station does not know when UE needs to be scheduled for uplink transmission. To enable uplink scheduling, the UE can be configured with scheduling request resource. When uplink resource is required for the UE, the UE can transmit a one-bit signal on the scheduling request resource based on the scheduling request procedure.

The base station provides to the UE configuration information for dedicate scheduling request procedure in RRCReconfiguration 3B11.

The configuration information comprises four main components: mapping information between events and the counter/timer/time resource/frequency resource, configuration information for counter/timer, configuration information for time resource, and configuration information for frequency resource.

One or more instances of configuration information on counter/timer (e.g. SchedulingRequestToAddMod) can be provided to the UE; each of them is associated with an identifier (e.g. schedulingRequestId). An initial value for counter (e.g. sr-TransMax) defines the number of consecutive times for SR transmission that is allowed. The timer (sr-Prohibittimer) defines the minimum time duration between the consecutive SR transmission.

One or more instances of configuration information on scheduling request resource (e.g. SchedulingRequestResourceConfig) can be provided to the UE; each of them is associated with an identifier (schedulingRequestID). The configuration information further comprises time domain information for the resource (e.g. periodicity AndOffset) and the identifier of the associated timer/counter (schedulingRequestResourceld) and the identifier of the associated frequency domain resource (PUCCH-Resourceld).

One or more instances of configuration information on PUCCH resource (e.g. PUCCH-Resource) can be provided to the UE; each of them is associated with an identifier (e.g. PUCCH-ResourceId). The configuration information comprises identifier of PRB where the PUCCH resource starts and an indication whether intra-slot frequency hopping is enabled.

The base station can indicate UE which counter/timer shall be used for which SR triggering event by binding the SR triggering event with a schedulingRequestId.

SR triggering event can be: data arrival in logical channel, SCell beam failure recovery, positioning measurement gap activation/deactivation request etc.

When an SR triggering event occurs 3B21, the UE determines the associated counter/timer based on the mapping information between SR triggering event and schedulingRequestId. Based on the determined schedulingRequestID, the UE determines the associated PUCCH-Resource and the associated SchedulingRequestResource 3B31; more specifically, the UE determines that the SchedulingRequestResource of which configuration information comprises schedulingRequestID is the SchedulingRequestResource associated with the timer/counter identified by the schedulingRequestID.

The UE transmits the SR 3B41:

>1: in the time/frequency resource determined from SchedulingRequestResource associated with the schedulingRequestId; and >1: based on the prohibit timer and the initial counter value determined from the schedulingRequestId.

SchedulingRequestToAddMod and SchedulingRequestResource have one to one relationship between them.

Figure 3C:
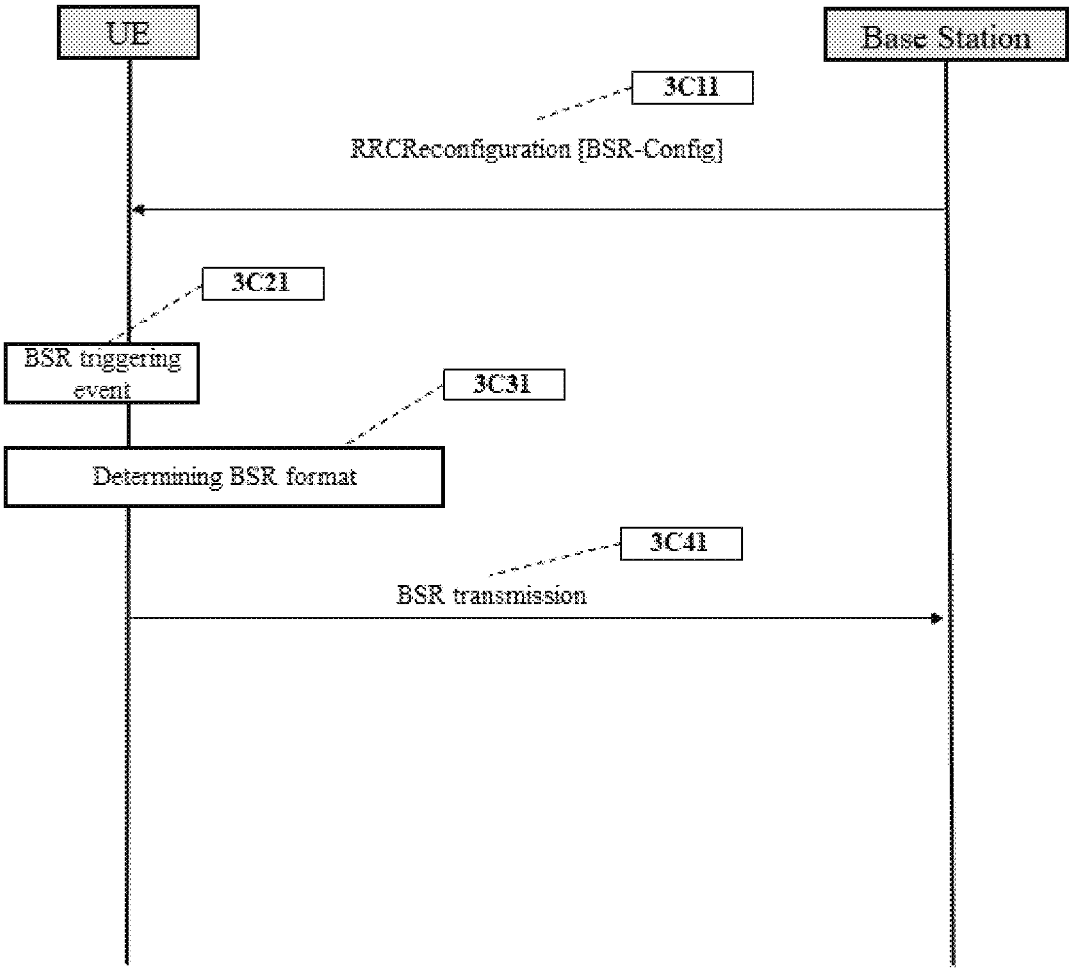
FIG. 3C illustrates buffer status reporting procedure.

FIG. 3C illustrates buffer status reporting procedure.

Unlike downlink traffic, the scheduler in the base station does not know when and how much and how important data arrives in the UE. To provide information on buffer status, the UE may transmit a Buffer Status Report (BSR) MAC CE when deemed triggered. BSR MAC CE comprises one or more Buffer Size field, each of which indicates the amount of data available for transmission across logical channels of a logical channel group.

The base station provides a BSR configuration via a dedicate RRC message such as RRCReconfiguration 3C11. The BSR configuration comprises a timer controlling periodic reporting and other information. The mapping information between a logical channel and a logical channel group is also provided in the dedicate RRC message.

BSR can be triggered event-driven or periodically or based on padding. Upon a significant event that cause buffer status change or upon expiry of a timer or upon space for padding being available, BSR is triggered 3C21.

A BSR shall be triggered if any of the following events occur for activated cell group:

>1: UL data, for a logical channel which belongs to an LCG, becomes available to the MAC entity; and either >>2: this UL data belongs to a logical channel with higher priority than the priority of any logical channel containing available UL data which belong to any LCG; or >>2: none of the logical channels which belong to an LCG contains any available UL data.

>1: in which case the BSR is referred below to as 'Regular BSR';

>1: UL resources are allocated and number of padding bits is equal to or larger than the size of the Buffer Status Report MAC CE plus its subheader, in which case the BSR is referred below to as 'Padding BSR';

>1: retxBSR-Timer expires, and at least one of the logical channels which belong to an LCG contains UL data, in which case the BSR is referred below to as 'Regular BSR';

>1: periodicBSR-Timer expires, in which case the BSR is referred below to as 'Periodic BSR'.

The UE determines the format of the BSR depending on which event triggers the BSR 3C31.

Based on the number of logical channel groups with data available for transmission, a short format and a long format are defined.

Based on whether all logical channels can be reported or not, a truncated format and the normal/full format are defined.

Short BSR and Short Truncated BSR comprise following fields:

>1: LCG ID field indicates the identifier of LCG whose buffer status is being reported.

>1: short Buffer Size field indicates the total amount of data available across all logical channels of a logical channel group. The amount of data is indicated in number of bytes. The length of this field is 5 bit.

Long BSR and Long Truncated BSR comprises following fields:

>1: Bitmap field comprises 8 bit. Each bit indicates the presence of the Buffer Size field for the corresponding logical channel group;

>1: long Buffer Size field indicates the total amount of data available across all logical channels of a logical channel group. The amount of data is indicated in number of bytes. The length of this field is 8 bit.

In principle, since the information contained in BSR triggered due to new uplink data or timer expiry is crucial for uplink scheduling, BSR format is determined solely based on the number of LCGs for reporting. On the other hands, the information contained in BSR triggered due to padding is supplementary information for uplink scheduling, BSR format is determined based on the number of LCGs and the size of padding space.

The UE transmits a Short BSR in the following case:

>1: only one LCG has data available for transmission and the BSR is triggered due to new uplink data or timer expiry; or >1 only one LCG has data available for transmission and the size of padding is enough to accommodate the Short BSR.

The UE transmits a Short Truncated BSR in the following case:

>1: padding occurs (e.g. MAC SDUs or MAC CEs do not fill up all the available space of MAC PDU); and >1: more than one LCG have data available for transmission; and >1: the size of padding is not enough to accommodate a Long BSR or a Long Truncated BSR but enough to accommodate the Short Truncated BSR.

The UE transmits a Long BSR in the following case:

>1: more than one LCGs have data available for transmission and the BSR is triggered due to new uplink data or timer expiry.

The UE transmits a Long Truncated BSR in the following case:

>1: padding occurs; and

>1: more than one LCG have data available for transmission; and

>1: the size of padding is not enough to accommodate a Long BSR but enough to a Long Truncated BSR.

The UE transmits BSR 3C41. To get the uplink resource for BSR transmission, if the BSR is triggered for new uplink data that is important than what are stored previously, scheduling request procedure can be initiated beforehand.

Figure 3D:
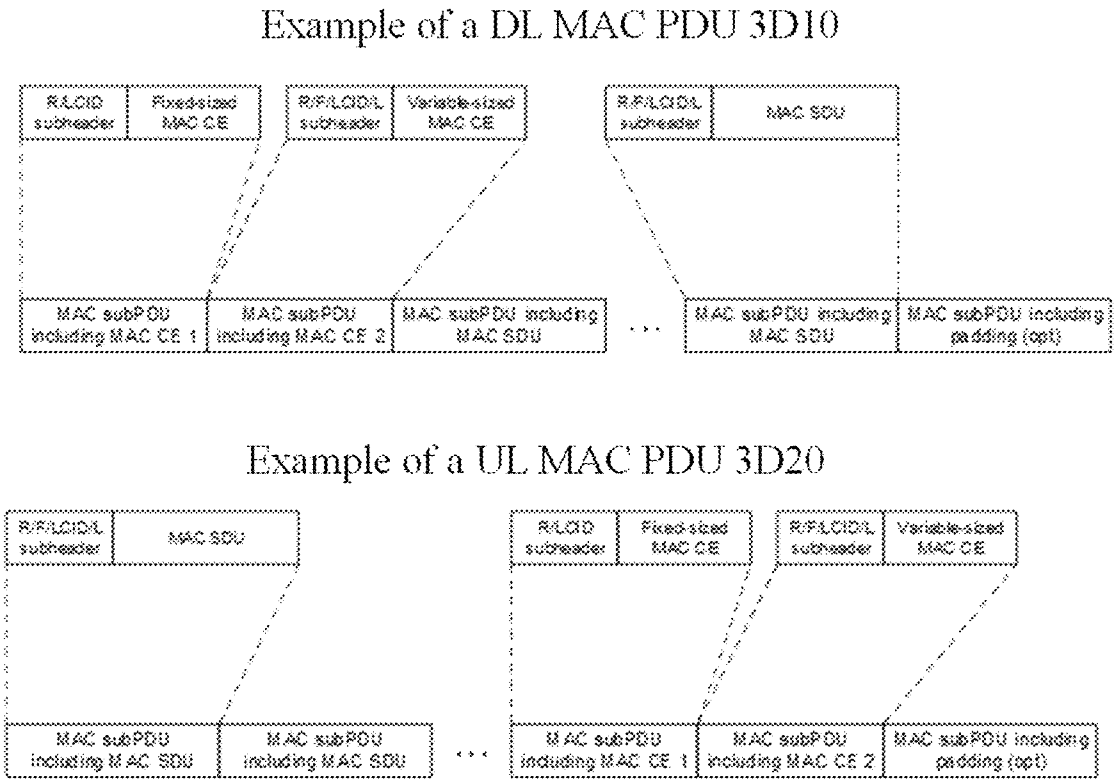
FIG. 3D illustrates MAC PDU format.

FIG. 3D illustrates MAC PDU format.

A MAC PDU is a bit string that is byte aligned (i.e. multiple of 8 bits) in length. Bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit.

A MAC SDU is a bit string that is byte aligned (i.e. multiple of 8 bits) in length. A MAC SDU is included into a MAC PDU from the first bit onward.

A MAC CE is a bit string that is byte aligned (i.e. multiple of 8 bits) in length.

A MAC subheader is a bit string that is byte aligned (i.e. multiple of 8 bits) in length. Each MAC subheader is placed immediately in front of the corresponding MAC SDU, MAC CE, or padding.

A MAC PDU consists of one or more MAC subPDUs. Each MAC subPDU consists of one of the following:

>: A MAC subheader only (including padding);

>: A MAC subheader and a MAC SDU;

>: A MAC subheader and a MAC CE; and

>: A MAC subheader and padding.

A DL MAC PDU 3D10 comprises MAC subPDUs for MAC CE first and MAC subPDUs for MAC SDU next. An UL MAC PDU 3D20 comprises MAC subPDUs for MAC SDU first and MAC subPDUs for MAC CE next. The difference is to ensure that UE have sufficient processing time for MAC SDUs (e.g. pre-processing).

FIG. 3E illustrates MAC subheader format.

Each MAC subheader corresponds to either a MAC SDU, a MAC CE, or padding.

A MAC subheader except for fixed sized MAC CE, padding, and a MAC SDU containing UL CCCH consists of the header fields R/F/LCID/(eLCID)/L 3E20. A MAC subheader for fixed sized MAC CE and padding consists of the header fields R/LCID/(eLCID) 3E10. A MAC subheader for a MAC SDU containing UL CCCH consists of the header fields (LX)/R/LCID 3E30.

MAC CEs are placed together. DL MAC subPDU(s) with MAC CE(s) is placed before any MAC subPDU with MAC SDU and MAC subPDU with padding. UL MAC subPDU(s) with MAC CE(s) is placed after all the MAC subPDU(s) with MAC SDU and before the MAC subPDU with padding in the MAC PDU.

The MAC subheader consists of the following fields:

>LCID: The Logical Channel ID field identifies the logical channel instance of the corresponding MAC SDU or the type of the corresponding MAC CE or padding. There is one LCID field per MAC subheader. The size of the LCID field is 6 bits. If the LCID field is set to 34, one additional octet is present in the MAC subheader containing the eLCID field and follow the octet containing LCID field. If the LCID field is set to 33, two additional octets are present in the MAC subheader containing the eLCID field and these two additional octets follow the octet containing LCID field;

>ELCID: The extended Logical Channel ID field identifies the logical channel instance of the corresponding MAC SDU or the type of the corresponding MAC CE. The size of the eLCID field is either 8 bits or 16 bits.

>L: The Length field indicates the length of the corresponding MAC SDU or variable-sized MAC CE in bytes. There is one L field per MAC subheader except for subheaders corresponding to fixed-sized MAC CEs, padding, and MAC SDUs containing UL CCCH. The size of the L field is indicated by the F field;

>F: The Format field indicates the size of the Length field. There is one F field per MAC subheader except for subheaders corresponding to fixed-sized MAC CEs, padding, and MAC SDUs containing UL CCCH. The size of the F field is 1 bit. The value 0 indicates 8 bits of the Length field. The value 1 indicates 16 bits of the Length field;

>LX: The LCID extension field indicates the use of extended LCID space. The size of the LX field is 1 bit. The LX field set to 1 indicates the use of table 3E40, otherwise R bit is present instead (i.e. set to 0);

The MAC subheader is octet aligned.

Figure 3F:
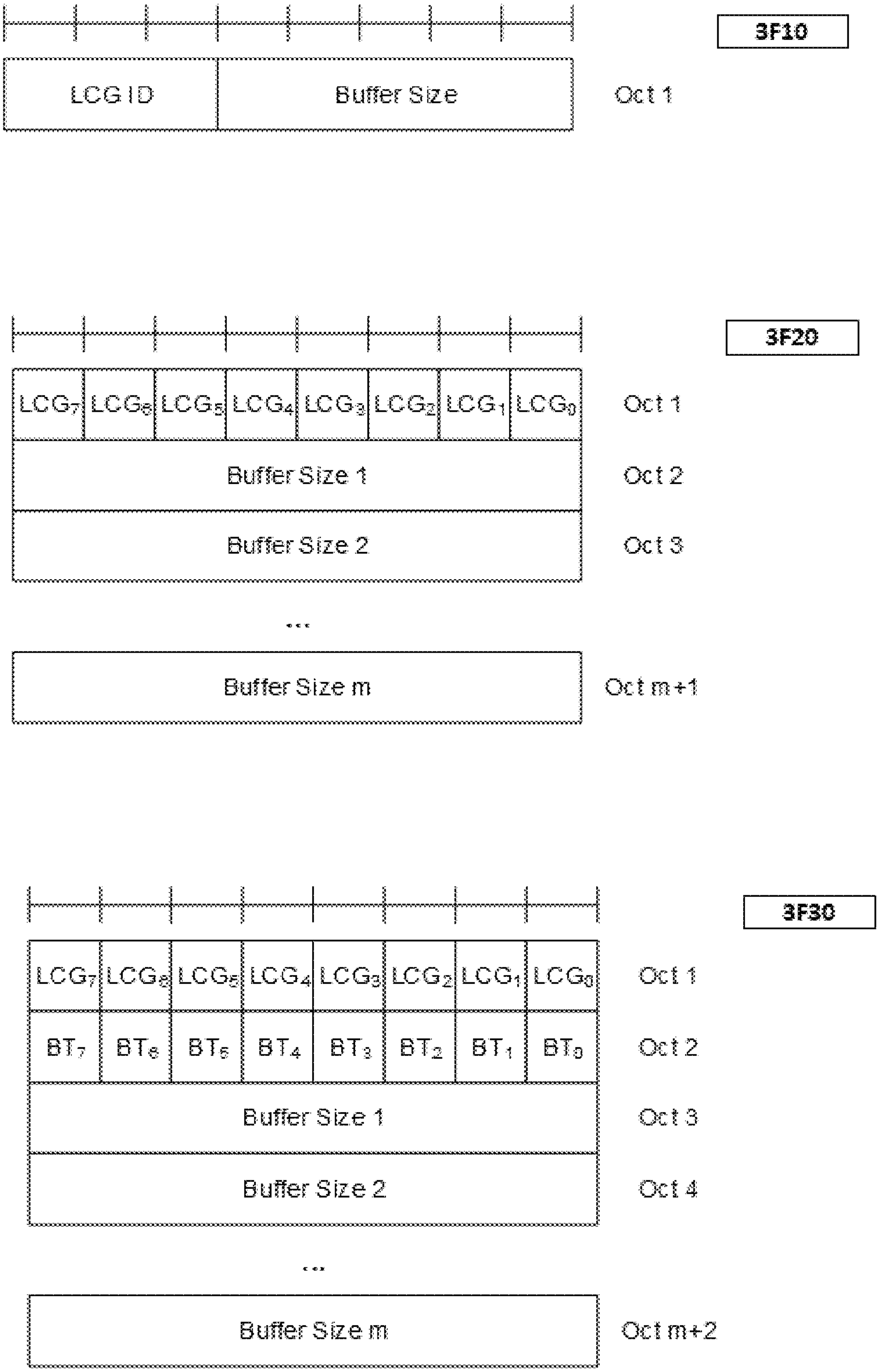
FIG. 3F is a diagram illustrating various formats of BSR.

FIG. 3F is a diagram illustrating various formats of BSR.

Buffer Status Report (BSR) MAC CEs consist of either:

>: Short BSR format (fixed size) 3F10; or

>: Long BSR format (variable size) 3F20; or

>: Refined BSR format (variable size) 3F30.

The BSR formats are identified by MAC subheaders with LCIDs.

The Refined BSR format is identified by MAC subheaders with eLCID.

The fields in the BSR MAC CE are defined as follows:

>: LCG ID: The Logical Channel Group ID field identifies the group of logical channel(s) whose buffer status is being reported. The length of the field is 3 bits for the case of Short BSR and Short Truncated BSR formats, and 8 bits for the case of Extended Short BSR and Extended Short Truncated BSR formats;

>: $LCG_i$: this field indicates the presence of the Buffer Size field for logical channel group i. The $LCG_i$ field set to 1 indicates that the Buffer Size field for the logical channel group i is reported. The $LCG_i$ field set to 0 indicates that the Buffer Size field for the logical channel group i is not reported;

>: $BT_i$: this field indicates which buffer size table is used to encode the buffer size of the logical channel group i. The $BT_i$ field set to 1 indicates that the third buffer size table is used for the logical channel group i. The $BT_i$ field set to 0 indicates that the second buffer size table is used for the logical channel group i or the buffer size table is not used for the logical channel group i. UE sets the BTi field to 0 if LCGi field is 0. The UE sets the BTi field based on the total amount of data of LCGi available for transmission if LCGi field is 1.

>: Buffer Size: The Buffer Size field identifies the total amount of data available according to the data volume calculation procedure across all logical channels of a logical channel group after the MAC PDU has been built (i.e. after the logical channel prioritization procedure, which may result the value of the Buffer Size field to zero). The size of the RLC headers and MAC subheaders are not considered in the buffer size computation. For refined BSR format, if the amount of data for an LCG is within the closed range of the buffer sizes specified in the third table, the MAC entity shall use the third BSR table to set the value of this field. Otherwise, the MAC entity shall use the second BSR table. The amount of data in this field is indicated in number of bytes. The length of this field is 5 bit (in case of short BSR format) or 8 bits (in case of long BSR format or refined BSR format). The Buffer Size fields are included in ascending order based on the $LCG_i$.

Figure 3G:
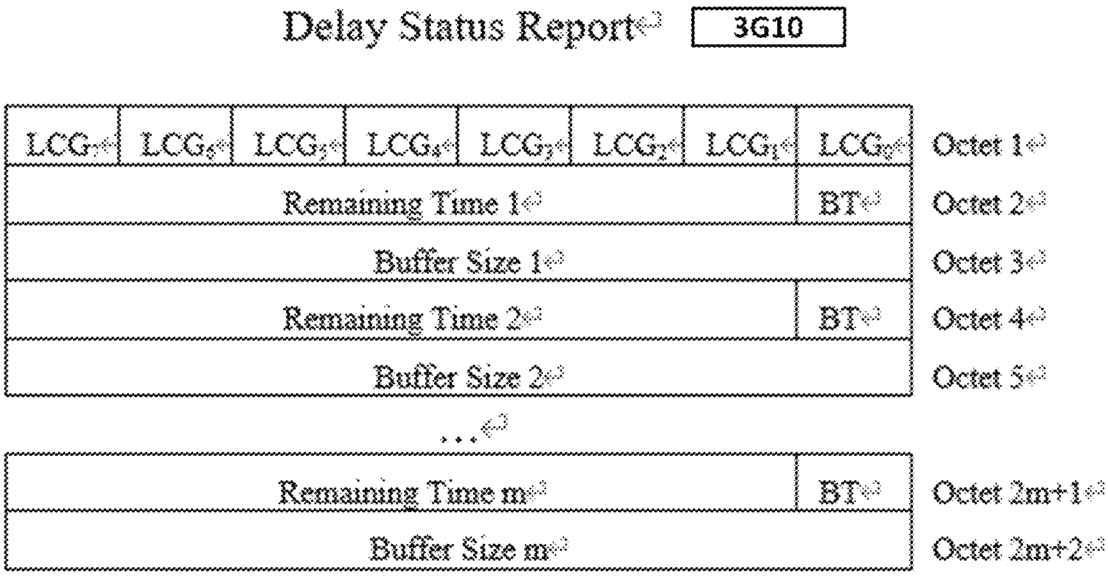
FIG. 3G is a diagram illustrating a format of DSR.

FIG. 3G is a diagram illustrating a format of DSR.

The Delay Status Report (DSR) MAC CE 3G10 is identified by MAC subheader with an eLCID.

The fields in the DSR MAC CE are defined as follows:

>: $LCG_i$: This field indicates the presence of delay information (i.e. the BT field and the Remaining Time and Buffer Size fields) for the LCG i. The $LCG_i$ field set to 1 indicates that the delay information for the LCG i is reported. The $LCG_i$ field set to 0 indicates that the delay information for the LCG i is not reported; UE includes the delay information for the LCG which is:

>>: configured for delay status reporting; and/or

>>: the smallest remaining value of PDCP discardTimers of all SDUs of all logical channels of the LCG is smaller than (below) remaining TimeThreshold. (LCG that have at least one delay-critical PDCP SDU);

>: BT: This field indicates which buffer size table is used to encode the buffer size of the associated logical channel group (e.g. the buffer size field in the next octet, or the buffer size field that follows Remaining time field that follows BT field);

>: Remaining time: This field indicates the shortest remaining value of PDCP discardTimer among all PDCP SDUs buffered for an LCG, at the time of the first symbol of the first PUSCH transmission that includes this DSR MAC CE. It is 7 bit. 0 (first value/index/code point) indicates 0~1 ms, 1 indicates 1~2 ms, 126 indicates 126~127 ms and 127 (last value/index/code point) indicates shortest remaining value is above 127 ms;

>: Buffer Size: The Buffer Size field indicates the total amount of delay-critical UL data for an LCG according to the data volume calculation procedure for the associated PDCP and RLC entities, respectively after the MAC PDU has been built (after logical channel prioritization procedure). This field is indicated in bytes. The length of this field is 8 bits.

The reference time point of Remaining time field (which is at the time of the first symbol of the first PUSCH transmission that includes this DSR MAC CE) and the reference time point of Buffer Size field (according to the data volume calculation across all logical channels of a logical channel group after the MAC PDU has been built (i.e. after the logical channel prioritization procedure, which may result the value of the Buffer Size field to zero)) is different. It may increase UE complexity but enhance the usefulness of the information.

The Remaining Time field, the BT field, and the Buffer Size field for an LCG shall be reported in two consecutive octets. These three fields for different LCGs shall be included in a DSR MAC CE in ascending order based on the LCGi.

Figure 4A:
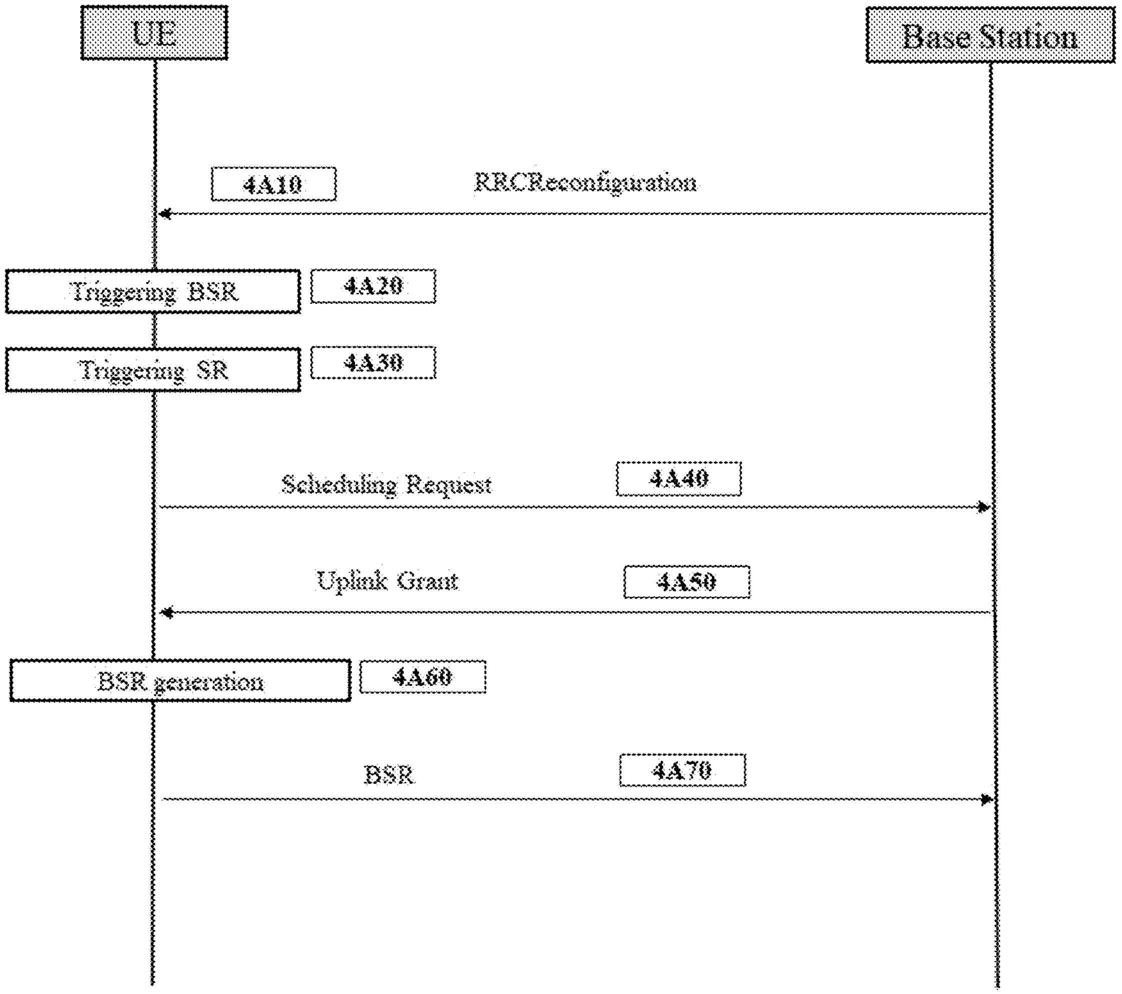
FIG. 4A is a diagram illustrating operations of the terminal and the base station for buffer status reporting.

FIG. 4A illustrates the operation of the terminal and the base station for BSR.

At 4A10, GNB transmits to UE a RRCReconfiguration message. The message comprises a MAC-CellGroupConfig IE. The IE MAC-CellGroupConfig is used to configure MAC parameters for a cell group, including DRX and BSR and DSR.

```
MAC-CellGroupConfig ::=                SEQUENCE {
    drx-Config SetupRelease            {          DRX-Config        }
OPTIONAL,   -- Need M
    schedulingRequestConfig                        SchedulingRequestConfig
OPTIONAL,   -- Need M
    bsr-Config                                         BSR-Config
OPTIONAL,   -- Need M
    tag-Config                                         TAG-Config
OPTIONAL,   -- Need M
    phr-Config                                   SetupRelease { PHR-Config }
OPTIONAL,   -- Need M
    skipUplinkTxDynamic                    BOOLEAN,
    ...,
    [[
    csi-Mask                                            BOOLEAN
OPTIONAL,   -- Need M
    dataInactivityTimer                 SetupRelease { DataInactivityTimer }
OPTIONAL     -- Cond MCG-Only
    ]],
    [[
  additionalBSR-TableAllowed-r18        BIT STRING (SIZE (maxNrofLCGs-r18))
OPTIONAL,        -- Need R
    dsr-ConfigToAddModList-r18                          SEQUENCE (SIZE
(1..maxNrofLCGs-r18)) OF LCG-DSR-Config-r18            OPTIONAL,   -- Need
N
    dsr-ConfigToReleaseList-r18            SEQUENCE (SIZE (1..maxNrofLCGs-
r18)) OF LCG-Id-r18                     OPTIONAL        -- Need N
  ]]
  }
  LCG-DSR-Config-r18 ::= SEQUENCE {
    lcg-Id-r18                            LCG-Id-r18,
    remainingTimeThreshold-r18            INTEGER (5..68)
  }
  LCG-Id-r18 ::= INTEGER (0..maxLCG-ID)
```

additionalBSR-TableAllowed field indicates whether a UE is allowed to utilize the additional/third BSR table for a certain Logical Channel Group. The leftmost bit corresponds to LCG ID=0, second leftmost bit to LCG ID=1 and so on. The UE is allowed to utilize the additional/third BSR table for a Logical Channel Group only when the corresponding bit is set to 1.

lcg-Id field indicates identifier of the Logical Channel Group which the DSR configuration refers to.

remaining TimeThreshold field indicates remaining time threshold used for triggering DSR for the Logical Channel Group. Value in number of miliseconds.

The RRCReconfiguration message may comprise one or more PDCP-ConFIG. IE PDCP-Config is used to set the configurable PDCP parameters for signalling, MBS multicast and data radio bearers.

```
PDCP-Config ::=            SEQUENCE {
  drb                                SEQUENCE {
                  discardTimer            ENUMERATED {ms10, ms20, ms30, ms40,
ms50, ms60, ms75, ms100, ms150, ms200,
                                                  ms250, ms300, ms500, ms750,
ms1500, infinity}        OPTIONAL, -- Cond Setup
                  pdcp-SN-SizeUL              ENUMERATED {len12bits, len18bits}
OPTIONAL, -- Cond Setup1
                  pdcp-SN-SizeDL              ENUMERATED {len12bits, len18bits}
OPTIONAL, -- Cond Setup2
                  headerCompression       CHOICE {
                    notUsed                   NULL,
                    rohc                      SEQUENCE {
                      maxCID                              INTEGER (1..16383)
DEFAULT 15,
                      profiles                    SEQUENCE {
                        profile0x0001                     BOOLEAN,
                        profile0x0002                     BOOLEAN,
                        profile0x0003                     BOOLEAN,
                        profile0x0004                     BOOLEAN,
                        profile0x0006                     BOOLEAN,
                        profile0x0101                     BOOLEAN,
                        profile0x0102                     BOOLEAN,
                        profile0x0103                     BOOLEAN,
                        profile0x0104                     BOOLEAN
                      },
                      drb-ContinueROHC                ENUMERATED { true }
OPTIONAL       -- Need N
                    },
                    uplinkOnlyROHC            SEQUENCE {
                      maxCID                              INTEGER (1..16383)
```

-continued

```
Default 15,
                    profiles                    SEQUENCE {
                     profile0x0006                      BOOLEAN
                    },
                    drb-ContinueROHC                       ENUMERATED { true }
OPTIONAL       -- Need N
                 },
                 ...
               },
               integrityProtection              ENUMBERATED { enabled }
OPTIONAL,      -- Cond ConnectedTo5GC1
               statusReportRequired                 ENUMBERATED { true }
OPTIONAL,      -- Cond Rlc-AM-UM
               outOfOrderDelivery                    ENUMBERATED { true }
OPTIONAL       -- Need R
  }
OPTIONAL,      -- Cond DRB
    moreThanOneRLC                      SEQUENCE {
               primaryPath                SEQUENCE {
                 cellGroup                                   CellGroupId
OPTIONAL,      -- Need R
                 logicalChannel                           LogicalChannelIdentity
OPTIONAL       -- Need R
               },
               ul-DataSplitThreshold                      UL-DataSplitThreshold
OPTIONAL,      -- Cond SplitBearer
               pdcp-Duplication                                  BOOLEAN
OPTIONAL       -- Need R
    }
OPTIONAL,      -- Cond MoreThanOneRLC
    t-Reordering                         ENUMERATED {
                                              ms0, ms1, ms2, ms4, ms5, ms8, ms10,
ms15, ms20, ms30, ms40,
                                              ms50, ms60, ms80, ms100, ms120,
ms140, ms160, ms180, ms200, ms220,
                                              ms240, ms260, ms280, ms300, ms500,
ms750, ms1000, ms1250,
                                              ms1500, ms1750, ms2000, ms2250,
ms2500, ms2750,
                                              ms3000, spare28, spare27, spare26,
spare25, spare24,
                                              spare23, spare22, spare21, spare20,
                                              spare19, spare18, spare17, spare16,
spare15, spare14,
                                              spare13, spare12, spare11, spare10,
spare09,
                                              spare08, spare07, spare06, spare05,
spare04, spare03,
                                              spare02, spare01 }
OPTIONAL, -- Need S
    ...,
    [[
    cipheringDisabled                                       ENUMERATED {true}
OPTIONAL       -- Cond ConnectedTo5GC
    ]],
    [[
    discardTimerExt-r16                SetupRelease { DiscardTimerExt-r16 }
OPTIONAL,         -- Cond DRB2
    moreThanTwoRLC-DRB-r16             SEQUENCE {
               splitSecondaryPath-r16                     LogicalChannelIdentity
OPTIONAL,      -- Cond SplitBearer2
               duplicationState-r16      SEQUENCE (SIZE (3)) OF BOOLEAN
OPTIONAL       -- Need S
    }
OPTIONAL,      -- Cond MoreThanTwoRLC-DRB
    ethernetHeaderCompression-r16        SetupRelease { EthernetHeaderCompression-
r16 }                      OPTIONAL    -- Need M
    ]],
    [[
    survivalTimeStateSupport-r17                           ENUMERATED {true}
OPTIONAL,      -- Cond Drb-Duplication
    uplinkDataCompression-r17               SetupRelease { UplinkDataCompression-
r17 }                      OPTIONAL,       -- Cond Rlc-AM
    discardTimerExt2-r17                     SetupRelease { DiscardTimerExt2-r17 }
OPTIONAL,      -- Need M
    initialRX-DELIV-17                                     BIT STRING (SIZE (32))
OPTIONAL       -- Cond MRB-Initialization
    ]],
  [[
```

-continued

```
  pdu-SetDiscard-r18                               ENUMERATED {true}
OPTIONAL,       -- Need R
  discardTimerForLowImportance-r18                      SetupRelease
{ DiscardtimerForLowImportance-r18 }                  OPTIONAL --
Cond DRB2
  ]]
  }
```

discardTimer field comprises a value in ms of discardTimer. Value ms10 corresponds to 10 ms, value ms20 corresponds to 20 ms and so on.

discardTimerForLowImportance comprises a value in ms of discardTimerForLow Importance pdu-SetDiscard field indicates whether the UE shall perform PDU set based discarding for this PDCP entity.

The IE SchedulingRequestConfig is used to configure the parameters, for the dedicated scheduling request (SR) resources.

```
  -- ASN1START
  -- TAG-SCHEDULINGREQUESTCONFIG-START
  SchedulingRequestConfig ::=                   SEQUENCE {
    schedulingRequestToAddModList                   SEQUENCE (SIZE (1..maxNrofSR-
ConfigPerCellGroup)) OF SchedulingRequestToAddMod
OPTIONAL, -- Need N
    schedulingRequestToReleaseList                  SEQUENCE (SIZE (1..maxNrofSR-
ConfigPerCellGroup)) OF SchedulingRequestId
OPTIONAL   -- Need N
  }
  SchedulingRequestToAddMod ::=                 SEQUENCE {
    schedulingRequestId                           SchedulingRequestId,
    sr-ProhibitTimer                                ENUMERATED {ms1, ms2, ms4,
ms8, ms16, ms32, ms64, ms128}                 OPTIONAL, -- Need S
    sr-TransMax                                    ENUMERATED { n4, n8, n16, n32,
n64, spare3, spare2, spare1}
  }
  SchedulingRequestConfig-v1700 ::=             SEQUENCE {
    schedulingRequestToAddModListExt-v1700              SEQUENCE (SIZE
(1..maxNrofSR-ConfigPerCellGroup)) OF SchedulingRequestToAddModExt-v1700
OPTIONAL   -- Need N
  }
  SchedulingRequestToAddModExt-v1700 ::=        SEQUENCE {
    sr-ProhibitTimer-v1700                          ENUMERATED { ms192,
ms256, ms320, ms384, ms448, ms512, ms576, ms640, ms1082, spare7, spare6, spare5, spare4,
spare3, spare2, spare1}
OPTIONAL   -- Need R
  }
  -- TAG-SCHEDULINGREQUESTCONFIG-STOP
  -- ASN1STOP
```

schedulingRequestId field is used to modify a SR configuration and to indicate, in LogicalChannelConfig, the SR configuration to which a logical channel is mapped and to indicate, in SchedulingRequestresourceConfig, the SR configuration for which a scheduling request resource is used.

sr-ProhibitTimer field configures timer for SR transmission on PUCCH. Value is in ms. Value ms1 corresponds to 1 ms, value ms2 corresponds to 2 ms, and so on.

sr-TransMax field configures maximum number of SR transmissions. Value n4 corresponds to 4, value n8 corresponds to 8, and so on.

The IE RLC-BearerConfig is used to configure an RLC entity, a corresponding logical channel in MAC and the linking to a PDCP entity (served radio bearer).

```
  -- ASN1START
  -- TAG-RLC-BEARERCONFIG-START
```

-continued

```
  RLC-BearerConfig ::=                 SEQUENCE {
    logicalChannelIdentity               LogicalChannelIdentity,
    servedRadioBearer                      CHOICE {
                  srb-Identity               SRB-Identity,
                  drb-Identity               DRB-Identity
    }
OPTIONAL,       -- Cond LCH-SetupOnly
    reestablishRLC                           ENUMERATED {true}
```

-continued

```
OPTIONAL,       -- Need N
    rlc-Config                                        RLC-Config
OPTIONAL,       -- Cond LCH-Setup
    mac-LogicalChannelConfig                  LogicalChannelConfig
OPTIONAL,       -- Cond LCH-Setup
    ...,
    [[
    rlc-Config-v1610                              RLC-Config-v1610
OPTIONAL        -- Need R
    ]],
    [[
    rlc-Config-v1700                              RLC-Config-v1700
OPTIONAL,       -- Need R
    logicalChannelIdentityExt-r17        LogicalChannelIdentityExt-r17
OPTIONAL,       -- Cond LCH-SetupModMRB
    multicastRLC-BearerConfig-r17                  MulticastRLC-
BearerConfig-r17      OPTIONAL,      -- Cond LCH-SetupOnlyMRB
    servedRadioBearerSRB4-r17                 SRB-Identity-v1700
OPTIONAL        -- Need N
    ]]
```

-continued

```
}
-- TAG-RLC-BEARERCONFIG-STOP
-- ASN1STOP
```

reestablishRLC field indicates that RLC should be re-established. Network sets this to true at least whenever the security key used for the radio bearer associated with this RLC entity changes.

rlc-Config field configures the RLC mode (UM, AM) and provides corresponding parameters.

servedRadioBearer field associates the RLC Bearer with an SRB or a DRB. The UE shall deliver DL RLC SDUs received via the RLC entity of this RLC bearer to the PDCP entity of the servedRadioBearer.

The IE LogicalChannelConfig is used to configure the logical channel parameters.

```
-- ASN1START
-- TAG-LOGICALCHANNELCONFIG-START
LogicalChannelConfig ::=                SEQUENCE {
  ul-SpecificParameters                     SEQUENCE {
        priority                                INTEGER (1..16),
        prioritisedBitRate                      ENUMERATED {kBps0, kBps8,
kBps16, kBps32, kBps64, kBps128, kBps256, kBps512,
                                                  kBps1024,     kBps2048,
kBps4096, kBps8192, kBps16384, kBps32768, kBps65536, infinity},
        bucketSizeDuration                      ENUMERATED {ms5, ms10,
ms20, ms50, ms100, ms150, ms300, ms500, ms1000,
                                                              spare7,
spare6, spare5, spare4, spare3, spare2, spare1},
        allowedServingCells                           SEQUENCE (SIZE
(1..maxNrofServingCells-1)) OF ServCellIndex
OPTIONAL,          -- Cond PDCP-CADuplication
        allowedSCS-List                               SEQUENCE (SIZE
(1..maxSCSs)) OF SubcarrierSpacing              OPTIONAL,    -- Need R
        maxPUSCH-Duration                          ENUMERATED {ms0p02,
ms0p04, ms0p0625, ms0p125, ms0p25, ms0p5, ms0p01-v1700, spare1}
OPTIONAL,          -- Need R
        configuredGrantType1Allowed                  ENUMERATED {true}
OPTIONAL,          -- Need R
        logicalChannelGroup                         INTEGER (0..maxLCG-ID)
OPTIONAL,          -- Need R
        schedulingRequestID                           SchedulingRequestId
OPTIONAL,          -- Need R
        logicalChannelSR-Mask                   BOOLEAN,
        logicalChannelSR-DelayTimerApplied      BOOLEAN,
        ...,
        bitRateQueryProhibitTimer     ENUMERATED {s0, sodot4, s0dot8,
s1dot6, s3, s6, s12, s30}               OPTIONAL,              -- Need R
        [[
        allowedCG-List-r16                            SEQUENCE (SIZE (0..
maxNrofConfiguredGrantConfigMAC-1-r16)) OF ConfiguredGrantConfigIndexMAC-r16
OPTIONAL,          -- Need S
        allowedPHY-PriorityIndex-r16                ENUMERATED {p0, p1}
OPTIONAL           -- Need S
        ]],
        [[
        logicalChannelGroupIAB-Ext-r17          INTEGER (0..maxLCG-ID-IAB-
r17)                              OPTIONAL,              -- Need R
        allowedHARQ-mode-r17                                ENUMERATED
{harqModeA, harqModeB}                                 OPTIONAL   --
Need R
        ]]
  }
OPTIONAL,          -- Cond UL
  ...,
  [[
  channelAccessPriority-r16                                INTEGER (1..4)
OPTIONAL,          -- Need R
  bitRateMultiplier-r16                         ENUMERATED {x40, x70, x100,
x200}                          OPTIONAL                -- Need R
  ]]
}
-- TAG-LOGICALCHANNELCONFIG-STOP
-- ASN1STOP
```

logicalChannelGroup field indicates ID of the logical channel group, which the logical channel belongs to.

logicalChannelSR-Mask field controls SR triggering when a configured uplink grant of type1 or type2 is configured, true indicates that SR masking is configured for this logical channel.

maxPUSCH-Duration field indicates whether UL MAC SDUs from this logical channel can only be transmitted using uplink grants that result in a PUSCH duration shorter than or equal to the duration indicated by this field.

Priority field indicates logical channel priority.

prioritisedBitRate field configures prioritized bit rate. Value in kiloBytes/s. Value kBps0 corresponds to 0 kiloBytes/s, value kBps8 corresponds to 8 kiloBytes/s, value kBps16 corresponds to 16 kiloBytes/s, and so on.

schedulingRequestId field indicates the scheduling request configuration applicable for this logical channel.

At 4A20, UE determines that at least one event to trigger a BSR occurs.

At 4A30, UE determines to trigger SR based on the availability of UL-SCH resource for new transmission.

UE determines to generate a BSR MAC CE corresponding to the determined BSR format in case that:

>: UL-SCH resources are available for a new transmission; and

>: the UL-SCH resource can accommodate the MAC CE for BSR (generated according to the determined format) plus its subheader as result of logical channel prioritization;

UE determines to trigger SR in case that:

>: there is no UL-SCH resource available for a new transmission; or

>: UL-SCH resources avaialble for a new transmission can not accommodate the MAC CE for BSR (e.g. Refined BSR) plus its subheader as result of logical channel prioritization; or >: UL-SCH resources available for a new transmission do not meet the LCP mapping restrictions configured for the logical channel that triggered the BSR.

At 4A40, UE performs SR procedure (5.4.4). UE transmits to the GNB Scheduliang Request on PUCCH. UE starts sr-ProhibitTimer.

At 4A50, GBN transmits to the UE UL grant for new transmission.

If the UL grant can accommodate all pending data available for transmission:

>: UE cancels the pending SR(s) for BSR (e.g. Refined BSR) and stops respective sr-ProhibitTimer;

>: UE cancels the triggered BSR;

>: UE generates a MAC PDU according to the UL grant for new transmission; and

>: UE transmits the MAC PDU;

If the UL grant is not enough to accommodate all pending data available for transmission, UE performs the following.

At 4A60, UE determines BSR format to report. UE generates a BSR MAC CE corresponding to the determined BSR format. UE determines value to be set to BT bit and value to be set to BS field.

At 4A70, UE performs BSR transmission.

>: UE starts or restarts retxBSR-Timer

>: UE multiplexes the BSR MAC CE in the MAC PDU;

>: UE transmits the MAC PDU;

>: UE cancels the pending SR(s) for BSR (e.g. Refined BSR) and stops respective sr-ProhibitTimer.

UE determines BSR format as below:

>: UE determines to report Refined BSR for all LCGs which will have data available for transmission at the time when the MAC PDU containing the BSR is to be built in case that:

>>: at least one LCG is configured with additionalBSR-TableAllowed; and

>>: amount of data in the at least one LCG, after the MAC PDU containing the BSR is built (or when the MAC PDU containing the BSR is to be built, which is before the logical channel prioritization procedure for the MAC PDU), is within the closed range of the buffer sizes in the third BSR table (BSR table used for the Refined BSR MAC CE).

Note that "after the MAC PDU containing the BSR is built" is equivalent to "after the logical channel prioritization procedure for the MAC PDU".

>: UE determines to report Long BSR for all LCGs which will have data available for transmission at the time when the MAC PDU containing the BSR is to be built (which is before the logical channel prioritization procedure for the MAC PDU) in case that:

>>: no LCG is configured with additionalBSR-TableAllowed; and

>>: more than one LCG have data available for transmission when the MAC PDU containing the BSR is to be built.

>: UE determines to report Long BSR for all LCGs which will have data available for transmission at the time when the MAC PDU containing the BSR is to be built in case that:

>>: more than one LCG have data available for transmission when the MAC PDU containing the BSR is to be built;

>>: at least one LCG of the more than one LCG is configured with additionalBSR-TableAllowed; and >>: amount of data in none of the at least one LCG, after the MAC PDU containing the BSR is built (or when the MAC PDU containing the BSR is to be built, which is before the logical channel prioritization procedure for the MAC PDU), is within the closed range of the buffer sizes in the third BSR table (BSR table used for the Refined BSR MAC CE).

>: UE determines to report Short BSR for a LCG which will have data available for transmission at the time when the MAC PDU containing the BSR is to be built in case that:

>>: one LCG has data available for transmission when the MAC PDU containing the BSR is to be built; and >>: the LCG is not configured with additionalBSR-TableAllowed.

Figure 4B:
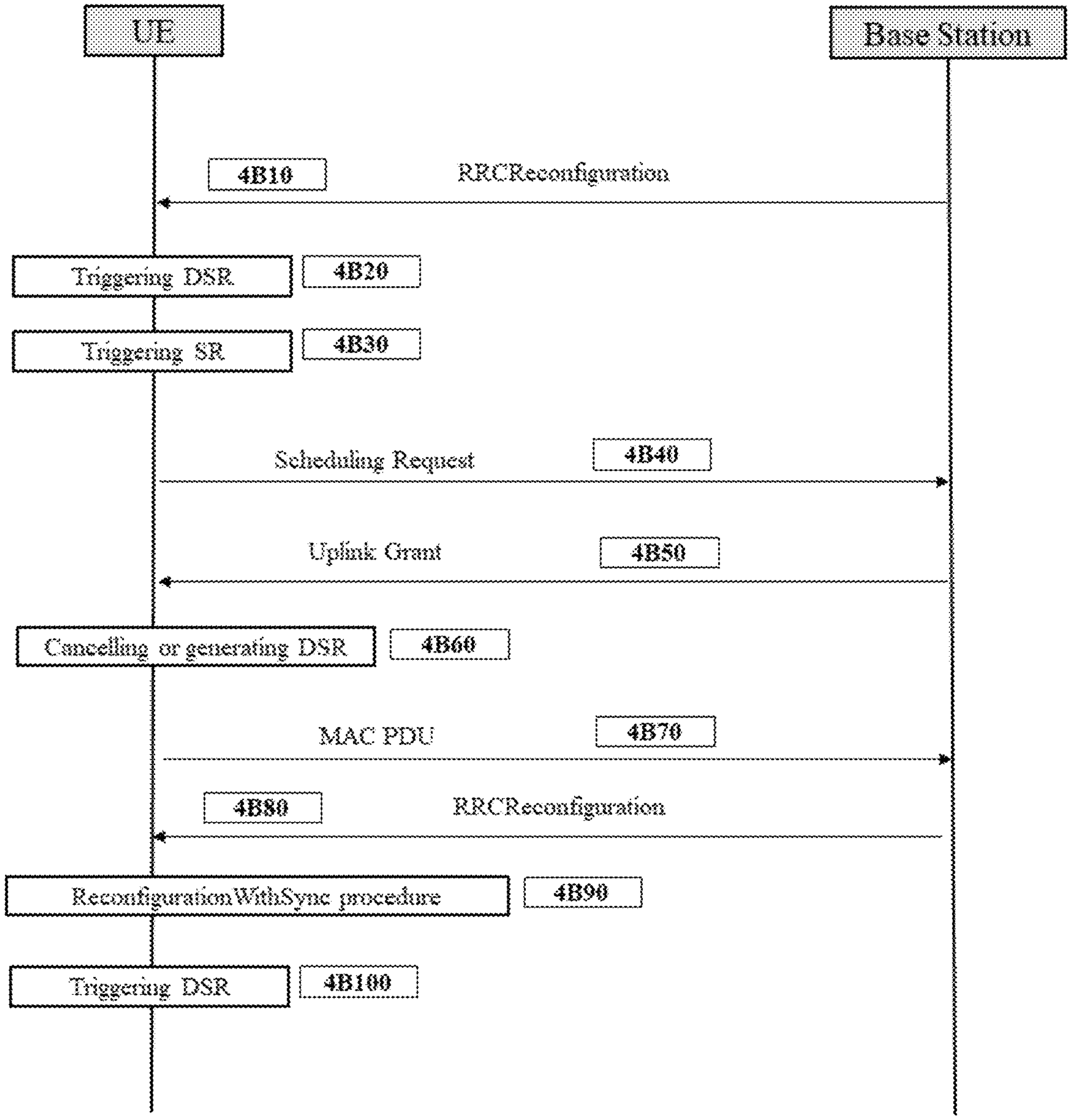
FIG. 4B is a diagram illustrating operations of the terminal and the base station for delay status reporting.

>: UE determines to report Short BSR for a LCG which will have data available for transmission at the time when the MAC PDU containing the BSR is to be built in case that:

>>: one LCG has data available for transmission when the MAC PDU containing the BSR is to be built; and >>: the LCG is configured with additionalBSR-TableAllowed; and >>: amount of data in the LCG, after the MAC PDU containing the BSR is built (or when the MAC PDU containing the BSR is to be built, which is before the logical channel prioritization procedure for the MAC PDU), is not within the closed range of the buffer sizes in the third BSR table (BSR table used for the Refined BSR MAC CE);

FIG. 4B illustrates the operation of the terminal and the base station for DSR.

At 4B10, GNB transmits to UE a RRCReconfiguration message. The message comprises a MAC-CellGroupConfig IE.

At 4B20, UE determines that at least one event to trigger a DSR occurs.

The Delay Status Reporting (DSR) procedure is used to provide the serving gNB with delay status of LCGs. This delay status for an LCG includes remaining time, which is the smallest remaining value of the PDCP discardTimers of SDUs buffered for the LCG, and the total amount of delay-critical UL data for the LCG according to the data volume calculation procedure for the associated PDCP and RLC entities, respectively.

RRC controls the DSR procedure by configuring the following parameter:

>: remainingTimeThreshold: the threshold on remaining time for triggering a DSR for an LCG.

If an LCG is configured for delay status reporting, the MAC entity shall,

>: if the smallest remaining value of the PDCP discardTimers of all SDUs buffered for the LCG is below remaining TimeThreshold; and >: if no DSR has been triggered for the LCG since the last transmission of a DSR MAC CE for the LCG (DSR MAC CE comprising delay status of the LCG):

>>2: trigger a DSR for the LCG.

A LCG consists of one or more logical channels.

UE shall,

>: If at least one LCG is configured for delay status reporting, the MAC entity shall, upon type 1 MAC reset (MAC reset due to e.g. handover, reconfiguration WithSync and mobility; MAC reset due to state transition or RLF or RRCReestablishment procedure is not type 1 MAC reset); and >: If the smallest remaining value of the PDCP discardTimers of all SDUs of all delay-critical LCGs is smaller than remainingTimeThreshold (if remaining value of at least one PDCP discardTimer of a delay-critical LCG is smaller than remainingTimeThreshold; delay-critical LCG is LCG configured for delay status reporting)

>>trigger a DSR after completion of random access procedure (or after type 1 MAC reset).

At 4B30, UE determines to trigger SR.

UE determines to trigger SR based on the availability of UL-SCH resource for new transmission.

UE determines to generate a DSR MAC CE in case that:

>: UL-SCH resources are available for a new transmission; and

>: the UL-SCH resource can accommodate the DSR MAC CE plus its subheader as result of logical channel prioritization;

UE determines to trigger SR in case that:

>: UL-SCH resource is not available for a new transmission; or

>: UL-SCH resource can not accommodate the DSR MAC CE plus its subheader as result of logical channel prioritization.

The MAC entity shall:

>: if the Delay status reporting procedure determines that at least one DSR has been triggered and not cancelled:

>>: if UL-SCH resources are available for a new transmission and the UL-SCH resources can accommodate the DSR MAC CE plus its subheader as a result of logical channel prioritization:

>>>: instruct the Multiplexing and Assembly procedure to generate the DSR MAC CE(s);

>>: else:

>>>: if there is no UL-SCH resource available for a new transmission; or

>>>: if the UL-SCH resources is not enough to accommodate the DSR MAC CE plus its subheader as a result of logical channel prioritization; or >>>: if the UL-SCH resources available for a new transmission do not meet the LCP mapping restrictions (see clause 5.4.3.1) configured for the logical channel that triggered the BSR; or >>>: if the smallest remaining value of the PDCP discardTimers of all SDUs at the time of the first symbol of the first PUSCH transmission based on the UL-SCH resource is smaller than x ms (x is configurable or fixed in the spec and stored in ROM):

>>>>: trigger a Scheduling Request.

At 4B40, UE performs SR procedure. UE transmits Scheduling Request on PUCCH. UE starts sr-ProhibitTimer.

At 4B50, UE receives UL grant for new transmission.

At 4B60, UE either cancels pending DSR or generates DSR.

UE determines to cancel pending SR if first specific conditions are fulfilled. UE determines to cancel pending DSR if second specific conditions are fulfilled.

UE cancels the pending SR(s) for DSR and stops respective sr-ProhibitTimer based on the determination. UE generates a MAC PDU according to the UL grant for new transmission. If the specific conditions are not fulfilled, UE generates DSR MAC CE and multiplex the DSR MAC CE into a MAC PDU.

At 4B70, UE transmits the MAC PDU. UE cancels the pending DSR if third specific conditions are fulfilled.

At 4B80, UE receives from the GNB a RRCReconfiguration for handover. The RRCReconfiguration message comprises Reconfiguration WithSync.

At 4B90, UE performs Reconfiguration WithSync procedure.

At 4B 100, UE triggers DSR during or after Reconfiguration WithSync procedure.

UE Operations for Buffer Status Reporting

UE may perform following operations for buffer status reporting w.r.t BT field and BS field determination:

>: receiving from a base station a RRCReconfiguration, wherein the RRCReconfiguration comprises additionalBSR-TableAllowed;

>: determining to trigger a BSR;

>: determining that uplink resource is available for new transmission;

>: determining to report Refined BSR based on that:

>>: amount of data in a LCG, when the MAC PDU containing the BSR is to be built, is equal to or greater than the lower bound buffer size of the lowest buffer size index of a second BS table; and >>: the amount of data in a LCG, when the MAC PDU containing the BSR is to be built, is smaller than the upper bound buffer size of the highest buffer size index of the second BS table; and >>: a bit corresponding to the LCG in the additonalBSR-TableAllowed is set to a first value;

>: triggering SR based on that the uplink resources available for a new transmission is not enough to accommodate the Refined BSR and its subheader.

"MAC PDU containing the BSR is to be built" is equivalent to "before logical channel prioritization".

Following sequences of operations are performed for BSR transmission:

>: BSR is triggered;

>: UL grant is received or UL grant becomes available;

>: BSR type determination is performed based on the amount of data at the current time;

>: Logical channel prioritization is performed;

>: BT field determination (which BS table to be used) is performed based on the amount of data remaining after LCP (e.g. amount of data @ current time–amount of data to be transmitted determined in LCP);

>: BS field determination (which BS index to be indicated in the BS field) is performed based on the amount of data remaining after LCP;

>: MAC PDU is built;

>: BSR transmission is performed.

Following sequences of operations are performed for DSR transmission:

>: DSR is triggered (based on the amount of data at the current time);

>: UL grant is received or UL grant becomes available;

>: Logical channel prioritization is performed;

>: BT field determination (which BS table to be used) is performed based on the amount of data remaining after LCP (e.g. amount of data @ current time–amount of data to be transmitted determined in LCP);

>: BS field determination (which BS index to be indicated in the BS field) is performed based on the amount of data remaining after LCP;

>: MAC PDU is built;

>: DSR transmission is performed.

UE may perform following operations for buffer status reporting:

>: receiving from a base station a RRCReconfiguration, wherein the RRCReconfiguration comprises additionalBSR-TableAllowed;

>: determining to trigger a BSR;

>: determining to report Refined BSR based on that:

>>: amount of data in a LCG when the MAC PDU containing the BSR is to be built is equal to or greater than the lower bound buffer size associated with the lowest buffer size index of a second BS table; and >>: the amount of data in a LCG when the MAC PDU containing the BSR is to be built smaller than the upper bound buffer size associated with the highest buffer size index of the second BS table; and >>: a bit corresponding to the LCG in the additonalBSR-TableAllowed is set to a first value;

>: determining a value to be indicated in BT field for a LCG based on the amount of data available across all logical channels of the LCG after logical channel prioritization;

>: determining a value to be indicated in the Buffer Size field for the LCG in the Refined BSR based on:

>>: the amount of data available across all logical channels of the LCG after logical channel prioritization; and >>: the determined value to be indicated in BT field;

>: generating Refined BSR;

>: starting or restarting periodicBSR-Timer;

>: starting or restarting retxBSR-Timer;

>: transmitting the Refined BSR;

UE may perform following operations for buffer status reporting.

>: receiving from a base station a RRCReconfiguration, wherein the RRCReconfiguration comprises additionalBSR-TableAllowed;

>: determining to trigger a BSR;

>: determining to report Refine BSR in case that first amount of data in a LCG is within closed range of the buffer sizes associated with a second table;

>: determining to use a first table to indicate Buffer Size of the LCG in the Refined BSR in case that second amount of data in the LCG is not within closed range of the buffer sizes associated with the second table;

>: determining the Buffer Size of the LCG in the Refined BSR based on a first table;

>: determining to use a second table to indicate Buffer Size of second LCG in the Refined BSR in case that second amount of data in the second LCG is within closed range of the buffer sizes associated with the second table;

>: determining the Buffer Size of the second LCG in the Refined BSR based on the second table;

>: wherein the first amount of data of the logical channel (LCG) is total amount of data available across all logical channels of the logical channel before logical channel prioritization;

>: wherein the second amount of data of the logical channel (LCG) is total amount of data available across all logical channels of the logical channel after logical channel prioritization;

>: wherein the first BSR table is associated with open range of buffer sizes;

>: wherein the second BSR table is associated with closed range of buffer sizes.

UE Operations for Delay Status Reporting

UE may perform following operations for delay status reporting:

>: receiving from a base station a RRCReconfiguration, wherein the RRCReconfiguration comprises:

>>: additionalBSR-TableAllowed; and

>>: one or more LCG-DSR-Config;

>: determining to trigger a DSR for a LCG based on that:

>>: the smallest remaining value of the PDCP discardTimers of all SDUs buffered for the LCG is below remainingTimeThreshold; and >>: no DSR has been triggered for the LCG since the last transmission of a DSR MAC CE for the LCG (i.e. DSR MAC CE comprises delay status of the LCG);

>: determining to trigger a SR for the DSR based on that:

>>: there is no UL-SCH resource available for a new transmission; or

>>: the UL-SCH resources is not enough to accommodate the DSR MAC CE plus its subheader as a result of logical channel prioritization; or >>: the UL-SCH resources available for a new transmission do not meet the LCP mapping restrictions configured for the logical channel that triggered the BSR; or >>: the smallest remaining value of the PDCP discardTimers of all SDUs at the time of the first symbol of the first PUSCH transmission of the UL-SCH is smaller than x ms (x is configurable or fixed in the spec/stored in ROM):

UE may perform followings:

>: receiving from a base station a RRCReconfiguration, wherein the RRCReconfiguration comprises:

>>: additionalBSR-TableAllowed; and

>>: one or more LCG-DSR-Config;

>: determining to trigger a DSR MAC CE for one or more LCGs at a first point of time based on that:
>>: MAC reset for mobility occurs; and
>>: at least one LCG is configured for delay status reporting; and
>>: remaining value of at least one PDCP discardTimer (for a SDU) of a delay-critical LCG is smaller than remaining TimeThreshold.
>: generating the DSR MAC CE, wherein the DSR MAC CE comprises:
>>: eight LCGi fields;
>>: one or more remaining time fields (indicating remaining time of PDCP discardTimer of the delay-critical PDCP SDU);
>>: one or more BT fields; and
>>: one or more Buffer Size fields (indicating amount of Delay-critical PDU Set)
>: transmitting the DSR MAC CE;
>: wherein the first point of time is after MAC reset and before transmission of RRCReconfigurationComplete starts (or before random access in the target cell starts; or before first uplink transmission in the target cell start);
>: wherein remainging time of LCGs of which smallest remaining value of all PDCP discardTimers of all SDUs of the LCG is below remainingTimeThreshold are reported in the DSR MAC CE UE may perform followings:
>: receiving from a base station a RRCReconfiguration, wherein the RRCReconfiguration comprises:
>>: additionalBSR-TableAllowed; and
>>: one or more LCG-DSR-Config;
>: determining to trigger a MAC CE, wherein the MAC CE comprises a bitmap and one or more Buffer Size fields, wherein each bit of the first bitmap indicates presence of each of one or more Buffer Size fields, wherein each of one or more Buffer Size fields corresponds to a LCG;
>: determining a buffer size table to encode each of one or more Buffer Size fields;
>: determining a buffer size field of each of one or more Buffer Size fields based on the buffer size table;
>: generating the MAC CE; and
>: transmitting the MAC CE,
>: wherein the MAC CE further comprises one or more BT fields,
>: wherein each BT field of the one or more BT fields:
>>: indicates the type of the BS table (first BS table or second BS table); and
>>: corresponds to a LCG,
>: wherein, in case that the MAC CE is Refinded BSR MAC CE, constant number of BT fields (8 BT fields) are encoded in eight consecutive bits, wherein the eight consecutive bits is in the second octet that follows the bitmap,
>: wherein, in case that the MAC CE is DSR MAC CE, n instances of BT fields are encoded in n discrete/interleaving bits, wherein:
>>: the first BT fields is in second octet that follows the bitmap;
>>: the second BT fields is in fourth octet; and
>>: the nth BT field is in 2*n th octet;
>: wherein, in case that the MAC CE is Refined BSR MAC CE:
>>: first BS table is used for a LCG in case that:
>>>: the corresponding BT field is set to a first value; and
>>>: the corresponding bit in the bit map is set to a first value,
>>: BS table is not used for a LCG in case that:
>>>: the corresponding BT field is set to a first value; and
>>>: the corresponding bit in the bit map is set to a second value,
>>: second BS table is used for a LCG in case that:
>>>: the corresponding BT field is set to a second value; and
>>>: the corresponding bit in the bit map is set to a first value,
>: wherein, in case that the MAC CE is DSR MAC CE:
>>: first BS table is used for a LCG in case that the corresponding BT field is set to a first value; and
>>: second BS table is used for a LCG in case that the corresponding BT field is set to a second value;

UE may perform followings:
>: receiving from a base station a RRCReconfiguration, wherein the RRCReconfiguration comprises:
>>: additionalBSR-TableAllowed; and
>>: one or more LCG-DSR-Config;
>: determining to trigger a DSR for a LCG based on that:
>>: the smallest remaining value of the PDCP discardTimers of all SDUs buffered for the LCG is below remainingTimeThreshold; and
>>: no DSR has been triggered for the LCG since the last transmission of a DSR MAC CE for the LCG;
>: determining to trigger a SR for the DSR based on that:
>>: there is no UL-SCH resource available for a new transmission; or
>>: the UL-SCH resources is not enough to accommodate the DSR MAC CE plus its subheader as a result of logical channel prioritization; or
>>: the UL-SCH resources available for a new transmission do not meet the LCP mapping restrictions configured for the logical channel that triggered the BSR; or
>>: the smallest remaining value of the PDCP discardTimers of all SDUs at the time of the first symbol of the first PUSCH transmission of the UL-SCH is smaller than x ms (x is configurable or fixed in the spec/stored in ROM):
>: transmitting SR on PUCCH;
>: starting sr-ProhibitTimer for the SR;
>: determining to cancel the SR for the DSR and to stop respective sr-ProhibitTimer when a MAC PDU is transmitted, wherein the MAC PDU comprises:
>>: buffer status up to (and including) the last event that triggered a DSR prior to the MAC PDU assembly; and
>>: delay status (Remaining time) up to (and including) the last event that triggered the DSR prior to the the MAC PDU assembly; or
>: determining to cancel the SR for the DSR and to stop respective sr-ProhibitTimer and to cancel the DSR based on that:
>>: an UL grant is available for new transmission; and
>>: the UL grant can accommodate (the UL grant provides uplink resource enough to contain) all pending delay-critical data available for transmission,
>: wherein the last event that triggered DSR for a LCG occurs when:
>>: Smallest remaining value of the PDCP discardTimers of all SDUs buffered for the LCG is below remainingtimeThreshold; and The LCG is configured for delay status reporting (e.g. LCG-DSR-Config is configured for the LCG); or >>: A non delay-critical PDCP SDU of the LCG becomes a Delay-critical PDCP SDU for a PDU set for a first time;

>: wherein pending delay-critical data is one or more PDCP SDUs available for transmission (and not yet transmitted), characterized by:

>>: PDCP SDUs belonging to a PDU set; and

>>: Smallest remaining value of the PDCP discardTimers of all SDUs belonging to the PDU set is below remainigtime Threshold The Data Volume Calculation Procedure For the purpose of MAC buffer status reporting, the transmitting PDCP entity shall consider the following as PDCP data volume:

>: the PDCP SDUs for which no PDCP Data PDUs have been constructed;

>: the PDCP Data PDUs that have not been submitted to lower layers;

>: the PDCP Control PDUs;

>: for AM DRBs, the PDCP SDUs to be retransmitted;

>: for AM DRBs, the PDCP Data PDUs to be retransmitted.

For the purpose of MAC buffer status reporting, the UE shall consider the following as RLC data volume:

>: RLC SDUs and RLC SDU segments that have not yet been included in an RLC data PDU;

>: RLC data PDUs that are pending for initial transmission;

>: RLC data PDUs that are pending for retransmission (RLC AM).

Data Volume Calculation for Delay Status Reporting

Delay-critical PDCP SDU is:

>: if pdu-SetDiscard is not configured, a PDCP SDU for which the remaining time till discardTimer expiry is less than the remaining TimeThreshold.

>: If pdu-SetDiscard is configured, a PDCP SDU belonging to a PDU Set of which at least one PDCP SDU has the remaining time till discardTimer expiry less than the remaining Time Threshold.

For the purpose of MAC delay status reporting, the transmitting PDCP entity shall consider the following as delay-critical PDCP data volume:

>the delay-critical PDCP SDUs for which no PDCP Data PDUs have been constructed;

>: the PDCP Data PDUs that contain the delay-critical PDCP SDUs and have not been submitted to lower layers;

>: the PDCP Control PDUs;

>: for AM DRBs, the PDCP SDUs to be retransmitted;

>: for AM DRBs, the PDCP Data PDUs to be retransmitted.

If a PDCP SDU becomes a delay-critical PDCP SDU, and if the corresponding PDCP Data PDU has already been submitted to lower layers, the delay-critical indication for the PDCP Data PDU is provided to lower layers.

Delay-critical RLC SDU is RLC SDU corresponding to a PDCP PDU indicated as delay-critical by PDCP.

For the purpose of MAC delay status reporting, the UE shall consider the following as delay-critical RLC data volume:

>: delay-critical RLC SDUs and delay-critical RLC SDU segments that have not yet been included in an RLC data PDU;

>: RLC data PDUs pending for initial transmission, and containing a delay-critical RLC SDU or a delay-critical RLC SDU segment;

>: RLC data PDUs that are pending for retransmission (RLC AM).

In addition, if a STATUS PDU has been triggered and t-StatusProhibit is not running or has expired, the UE shall estimate the size of the STATUS PDU that will be transmitted in the next transmission opportunity, and consider this as part of RLC data volume for MAC buffer status reporting and as part of delay-critical RLC data volume for MAC delay status reporting.

<discardTimer>

At reception of a PDCP SDU from upper layers, the transmitting PDCP entity shall:

>: if discardTimerForLowImportance is configured and PSI based SDU discard is activated, and the PDCP SDU belongs to a low importance PDU Set:

>>: start the discardTimerForLowImportance associated with this PDCP SDU;

>: else:

>>: start the discardTimer associated with this PDCP SDU (if configured).

When the discardTimer or discardTimerForLowImportance expires for a PDCP SDU, the transmitting PDCP entity shall:

>: if pdu-SetDiscard is configured:

>>: discard all PDCP SDUs belonging to the PDU Set to which the PDCP SDU belongs along with the corresponding PDCP Data PDUs;

>: else:

>>: discard the PDCP SDU along with the corresponding PDCP Data PDU.

If the corresponding PDCP Data PDU has already been submitted to lower layers, the discard is indicated to lower layers. For SRBs, when upper layers request a PDCP SDU discard, the PDCP entity shall discard all stored PDCP SDUs and PDCP PDUs.

When indicated from upper layer (e.g. PDCP) to discard a particular RLC SDU, the transmitting side of an AM RLC entity or the transmitting UM RLC entity shall discard the indicated RLC SDU, if neither the RLC SDU nor a segment thereof has been submitted to the lower layers. The transmitting side of an AM RLC entity shall not introduce an RLC SN gap when discarding an RLC SDU.

<Bs Table>

There are three buffer size tables (look-up tables comprise indexes and corresponding buffer size ranges) used for Buffer Status Reporting (BSR).

The first Buffer Size Table is for the 5-bit Buffer Size field. The first table is used when short BSR format is selected. It provides 32 index values (0-31) to represent buffer sizes.

>: Index 0 represents 0 bytes (empty buffer).

>: Index 31 represents >150,000 bytes.

The second Buffer Size field is for the 8-bit Buffer Size field. The second table is used for Long BSR format. It offers 256 index values (0-255).

>: Index 0 represents 0 bytes (empty buffer).

>: Index 255 represents >8,000,000 bytes.

The third Buffer Size field is for the 8-bit Buffer Size field. The third table is used for Refined BSR format. It offers 256 index values (0-255).

>: Index 0 represents a specific range between first value and second value.

>: Index 255 (or effectively highest index) represents another specific range between third value and fourth value.

>: the first value is predefined and greater than 0.

>: the fourth value is predefined and smaller than 8000000.

The first table and the second tables are allowed to be used if BSR is configured. The third table is allowed to be used only if a specific configuration parameter is present in a control message. The purpose of the third message is to enable buffer status reporting with finer granularity that is useful when XR service is ongoing.

The first value and the fourth value are related with typical packet sizes of XR traffic.

Logical Channel Prioritization

The Logical Channel Prioritization (LCP) procedure is applied whenever a new transmission is performed.

RRC controls the scheduling of uplink data by signalling for each logical channel per MAC entity:

>: priority where an increasing priority value indicates a lower priority level;

>: prioritisedBitRate which sets the Prioritized Bit Rate (PBR);

>: bucketSizeDuration which sets the Bucket Size Duration (BSD).

RRC additionally controls the LCP procedure by configuring mapping restrictions for each logical channel:

>: allowedSCS-List which sets the allowed Subcarrier Spacing(s) for transmission;

>: maxPUSCH-Duration which sets the maximum PUSCH duration allowed for transmission;

>: configuredGrantTypelAllowed which sets whether a configured grant Type 1 can be used for transmission;

>: allowedServingCells which sets the allowed cell(s) for transmission;

>: allowedCG-List which sets the allowed configured grant(s) for transmission;

>: allowedPHY-PriorityIndex which sets the allowed PHY priority index(es) of a dynamic grant for transmission;

>: allowedHARQ-mode which sets the allowed UL HARQ mode for transmission.

The following UE variable is used for the Logical channel prioritization procedure:

>: Bj which is maintained for each logical channel j.

The MAC entity shall initialize Bj of the logical channel to zero when the logical channel is established.

For each logical channel j, the MAC entity shall:

>: increment Bj by the product PBR x T before every instance of the LCP procedure, where T is the time elapsed since Bj was last incremented;

>: if the value of Bj is greater than the bucket size (i.e. PBR x BSD):

>>: set Bj to the bucket size.

The MAC entity shall, when a new transmission is performed:

>: select the logical channels for each UL grant that satisfy all the following conditions:

>>: the set of allowed Subcarrier Spacing index values in allowedSCS-List, if configured, includes the Subcarrier Spacing index associated to the UL grant; and >>: maxPUSCH-Duration, if configured, is larger than or equal to the PUSCH transmission duration associated to the UL grant; and >>: configuredGrantTypelAllowed, if configured, is set to true in case the UL grant is a Configured Grant Type 1; and >>: allowedServingCells, if configured, includes the Cell information associated to the UL grant. Does not apply to logical channels associated with a DRB configured with PDCP duplication within the same MAC entity (i.e. CA duplication) when CA duplication is deactivated for this DRB in this MAC entity; and >>: allowedCG-List, if configured, includes the configured grant index associated to the UL grant; and >>: allowedPHY-PriorityIndex, if configured, includes the priority index (as specified in clause 9 of TS 38.213 [6]) associated to the dynamic UL grant; and >>: allowedHARQ-mode, if configured, includes the allowed UL HARQ mode for the HARQ process associated to the UL grant.

The MAC entity shall, when a new transmission is performed:

>: allocate resources to the logical channels as follows:

>>: logical channels selected for the UL grant with Bj>0 are allocated resources in a decreasing priority order. If the PBR of a logical channel is set to infinity, the MAC entity shall allocate resources for all the data that is available for transmission on the logical channel before meeting the PBR of the lower priority logical channel(s);

>>: decrement Bj by the total size of MAC SDUs served to logical channel j above;

>>: if any resources remain, all the logical channels selected are served in a strict decreasing priority order (regardless of the value of Bj) until either the data for that logical channel or the UL grant is exhausted, whichever comes first. Logical channels configured with equal priority should be served equally.

Logical channels shall be prioritised in accordance with the following order (highest priority listed first):

>: MAC CE for C-RNTI, or data from UL-CCCH;

>: MAC CE for (Enhanced) BFR, or MAC CE for Configured Grant Confirmation, or MAC CE for Multiple Entry Configured Grant Confirmation;

>: MAC CE for Sidelink Configured Grant Confirmation;

>: MAC CE for LBT failure;

>: MAC CE for Timing Advance Report;

>: MAC CE for Delay Status Report;

>: MAC CE for (Extended) BSR, with exception of BSR included for padding;

>: MAC CE for Positioning Measurement Gap Activation/Deactivation Request;

>: MAC CE for the number of Desired Guard Symbols;

>: MAC CE for Case-6 Timing Request;

>: MAC CE for (Extended) Pre-emptive BSR;

>: MAC CE for SL-BSR, with exception of SL-BSR prioritized according to clause 5.22.1.6 and SL-BSR included for padding;

>: data from any Logical Channel, except data from UL-CCCH;

>: MAC CE for Recommended bit rate query;

>: MAC CE for BSR included for padding;

ReconfigurationWithSync Procedure

>: The UE shall perform the following actions to execute a reconfiguration with sync.

>>: if this procedure is executed for the MCG or if this procedure is executed for an SCG not indicated as deactivated in the E-UTRA or NR RRC message in which the RRCReconfiguration message is embedded:

>>>: start timer T304 for the corresponding SpCell with the timer value set to t304, as included in the reconfiguration WithSync;

>>: if the frequencyInfoDL is included:

>>>: consider the target SpCell to be one on the SSB frequency indicated by the frequencyInfoDL with a physical cell identity indicated by the physCellId;

>>: else:

>>>: consider the target SpCell to be one on the SSB frequency of the source SpCell with a physical cell identity indicated by the physCellId;

>>: if this procedure is performed due to an LTM cell switch execution:

>>>: start synchronising to the DL of the indicated LTM candidate cell, if no DL synchronization for the indicated LTM candidate cell has been already acquired;

>>: else:

>>>: start synchronising to the DL of the target SpCell;

>>: apply the specified BCCH configuration for the target SpCell;

>>: acquire the MIB of the target SpCell;

>>: reset the MAC entity of this cell group;

>>: consider the SCell(s) of this cell group, if configured, that are not included in the SCellToAddModList in the RRCReconfiguration message, to be in deactivated state;

>>: apply the value of the newUE-Identity as the C-RNTI for this cell group;

>>: configure lower layers in accordance with the received spCellConfigCommon;

>>: if rach-LessHO is included:

>>>: configure lower layers in accordance with rach-LessHO for the target SpCell;

>>: configure lower layers in accordance with any additional fields, not covered in the previous, if included in the received reconfiguration WithSync.

Figure 5A:
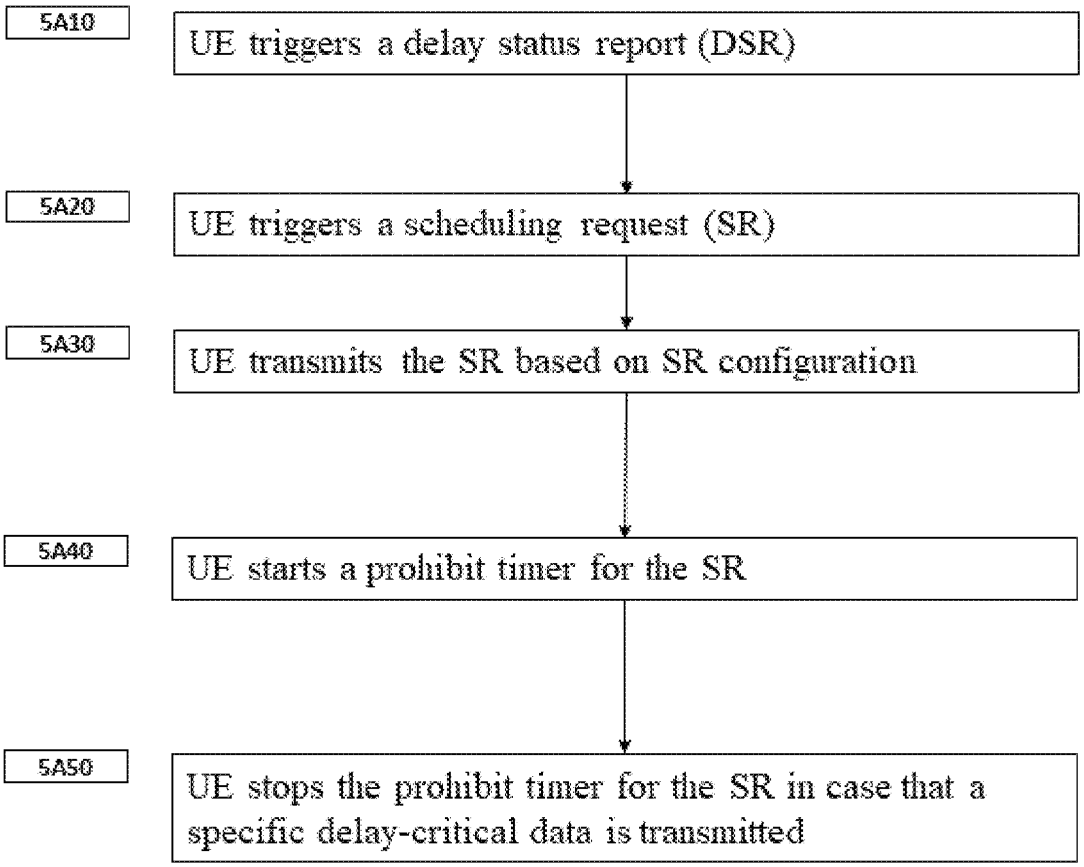
FIG. 5A is a diagram illustrating operations of the terminal.

FIG. 5A is a diagram illustrating operations of the terminal.

At 5A10, UE triggers a delay status report (DSR) for a one or more logical channels.

At 5A20, UE triggers a scheduling request (SR) in case that uplink resource available for new transmission is not enough to accommodate the DSR medium access control (MAC) control element (CE) and its subheader as a result of logical channel prioritization.

At 5A30, UE transmits the SR based on SR configuration.

At 5A40, UE starts a prohibit timer for the SR.

At 5A50, UE stops the prohibit timer for the SR in case that a specific delay-critical data is transmitted.

The specific delay-critical data is a delay-critical data that has not been transmitted.

The delay-critical data comprises packet data convergence protocol (PDCP) Service Data Units (SDUs) that belongs to a Protocol Data Unit (PDU) set of which at least one PDCP SDU has the remaining time till expiry of a discard timer less than a remaining time threshold.

The discard timer starts for a PDCP SDU when the PDCP SDU arrives at PDCP entity. The remaining time threshold is configured based on a radio resource control message.

UE stops the prohibit timer for the SR in case that a specific delay status is reported.

The DSR MAC CE comprises:

>: a field for buffer table;

>: a field for remaining time; and

>: a field for buffer size.

A value to be comprised in the field for remaining time is determined based on one or more packet data convergence protocol (PDCP) Service Data Units (SDUs) at a first time point. A value to be comprised in the field for buffer size is determined based on one or more PDCP SDUs at a second time point.

The first time point is at time of the first symbol of the first physical uplink shared channel transmission that includes the DSR MAC CE. The second time point is after logical channel selection for uplink transmission is performed.

The DSR for the one or more logical channels is triggered in case that:

>: smallest remaining value of discard timers of all packet data convergence protocol (PDCP) Service Data Units (SDUs) of the one or more logical channels is below remaining time threshold; and >: no DSR has been triggered for the one or more logical channels.

UE cancels the SR in case that the specific delay-critical data is transmitted.

The one or more logical channels belong to a logical channel group.

Figure 6A:
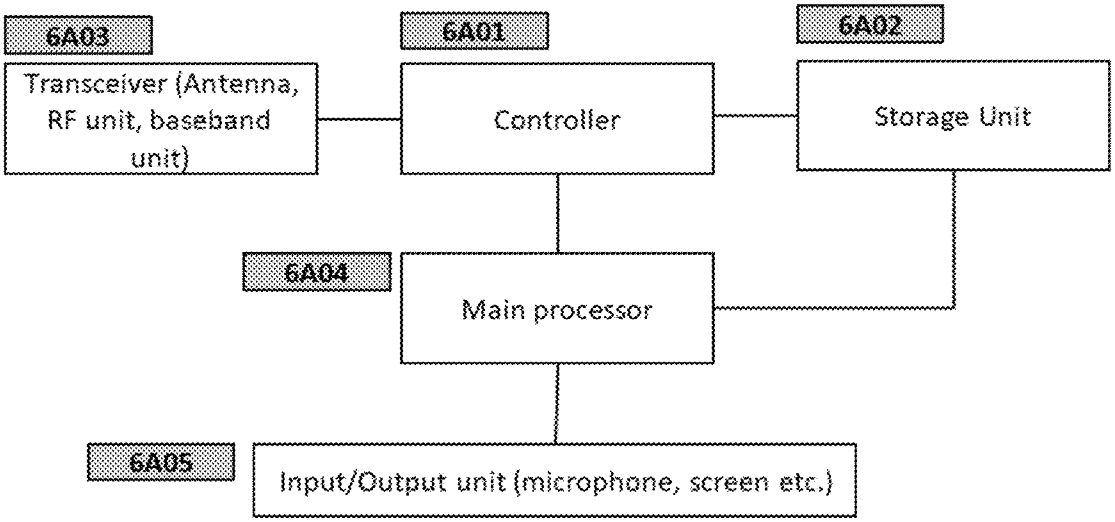
FIG. 6A is a block diagram illustrating the internal structure of a UE to which the disclosure is applied.

FIG. 6A is a block diagram illustrating the internal structure of a Terminal to which the disclosure is applied.

Referring to the diagram, the terminal includes a controller (6A01), a storage unit (6A02), a transceiver (6A03), a main processor (6A04) and I/O unit (6A05).

The controller (6A01) controls the overall operations of the terminal in terms of mobile communication. For example, the controller (6A01) receives/transmits signals through the transceiver (6A03). In addition, the controller (6A01) records and reads data in the storage unit (6A02). To this end, the controller (6A01) includes at least one processor. For example, the controller (6A01) may include a communication processor (CP) that performs control for communication and an application processor (AP) that controls the upper layer, such as an application program. The controller controls storage unit and transceiver such that UE operations illustrated in this disclosure are performed.

The storage unit (6A02) stores data for operation of the terminal, such as a basic program, an application program, and configuration information. The storage unit (6A02) provides stored data at a request of the controller (6A01).

The transceiver (6A03) consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi1Or, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor (6A04) controls the overall operations other than mobile operation. The main processor (6A04) process user input received from I/O unit (6A05), stores data in the storage unit (6A02), controls the controller (6A01) for required mobile communication operations and forward user data to I/O unit (6A05).

I/O unit (6A05) consists of equipment for inputting user data and for outputting user data such as a microphone and a screen. I/O unit (6A05) performs inputting and outputting user data based on the main processor's instruction.

Figure 6B:
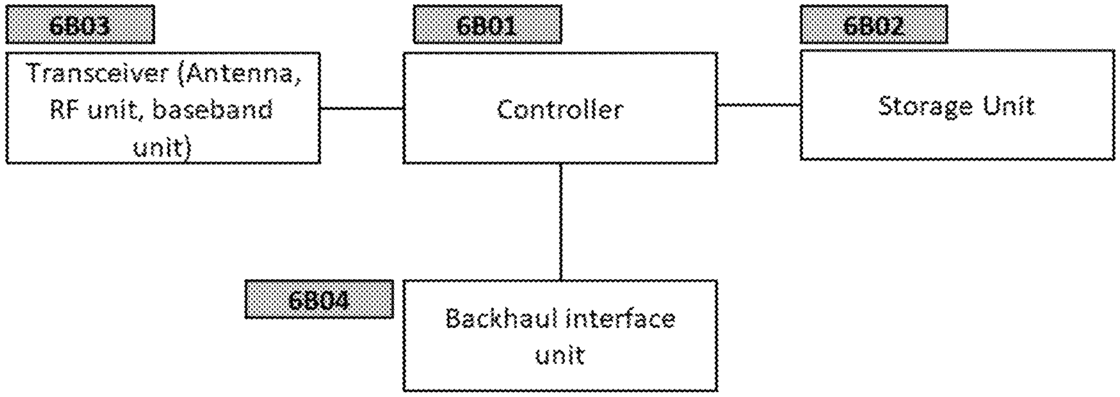
FIG. 6B is a block diagram illustrating the configuration of a base station according to the disclosure.

FIG. 6B is a block diagram illustrating the configuration of a base station according to the disclosure.

As illustrated in the diagram, the base station includes a controller (6B01), a storage unit (6B02), a transceiver (6B03) and a backhaul interface unit (6B04).

The controller (6B01) controls the overall operations of the main base station. For example, the controller (6B01) receives/transmits signals through the transceiver (6B03), or through the backhaul interface unit (6B04). In addition, the controller (6B01) records and reads data in the storage unit (6B02). To this end, the controller (6B01) may include at least one processor. The controller controls transceiver, storage unit and backhaul interface such that base station operation illustrated in FIG. 2A are performed.

The storage unit (6B02) stores data for operation of the main base station, such as a basic program, an application program, and configuration information. Particularly, the storage unit (6B02) may store information regarding a bearer allocated to an accessed UE, a measurement result reported from the accessed UE, and the like. In addition, the storage unit (6B02) may store information serving as a criterion to determine whether to provide the terminal with multi-connection or to discontinue the same. In addition, the storage unit (6B02) provides stored data at a request of the controller (6B01).

The transceiver (6B03) consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit (6B04) provides an interface for communicating with other nodes inside the network. The backhaul interface unit (6B04) converts a bit string transmitted from the base station to another node, for example, another base station or a core network, into a physical signal, and converts a physical signal received from the other node into a bit string.

Below lists acronym used in the present disclosure.

| | | | |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | | |
| RA-RNTI | Random Access RNTI | | |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DTX | Discontinuous Reception | SCS | Subcarrier Spacing |
| HARQ | Hybrid Automatic Repeat Request | | |
| SDAP | Service Data Adaptation Protocol | | |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | | |
| SSS | Secondary Synchronisation Signal | | |
| PDCP | Packet Data Convergence Protocol | SUL | Supplementary Uplink |
| PDSCH | Physical Downlink Shared Channel | | |

-continued

| | | | |
|---|---|---|---|
| TM | Transparent Mode | | |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | | |
| CRP | Cell Reselection Priority | | |
| PRB | Physical Resource Block | PSS | Primary Synchronisation Signal |
| PUCCH | Physical Uplink Control Channel | | |
| PUSCH | Physical Uplink Shared Channel | | |

What is claimed is:

1. A method performed by a terminal, the method comprising:

triggering a delay status report (DSR) for one or more logical channels;

triggering a scheduling request (SR) in case that uplink resource available for new transmission is not enough to accommodate a DSR medium access control (MAC) control element (CE) and its subheader as a result of logical channel prioritization;

transmitting the SR based on an SR configuration;

starting a prohibit timer for the SR; and stopping the prohibit timer for the SR in case that a-specific delay-critical data is transmitted.

2. The method of claim 1, wherein the specific delay-critical data is a delay-critical data that has not been transmitted before.

3. The method of claim 2, wherein the delay-critical data comprises packet data convergence protocol (PDCP) Service Data Units (SDUs) that belongs to a Protocol Data Unit (PDU) set of which at least one PDCP SDU has a remaining time till expiry of a discard timer that is less than a remaining time threshold.

4. The method of claim 3, wherein:

the discard timer starts for a PDCP SDU when the PDCP SDU arrives at a PDCP entity; and the remaining time threshold is configured based on a radio resource control (RRC) message.

5. The method of claim 1, wherein the terminal stops the prohibit timer for the SR in case that a specific delay status is reported.

6. The method of claim 1, wherein the DSR MAC CE comprises:

a field for buffer table;

a field for remaining time; and a field for buffer size.

7. The method of claim 6, wherein:

a value to be comprised in the field for remaining time is determined based on one or more packet data convergence protocol (PDCP) Service Data Units (SDUs) at a first time point; and a value to be comprised in the field for buffer size is determined based on one or more PDCP SDUs at a second time point.

8. The method of claim 7, wherein:

the first time point is a time of a first symbol of a first physical uplink shared channel (PUSCH) transmission that includes the DSR MAC CE; and the second time point is after logical channel selection for uplink transmission is performed.

9. The method of claim 1, wherein the DSR for the one or more logical channels is triggered in case that:

smallest remaining value of discard timers of all packet data convergence protocol (PDCP) Service Data Units (SDUs) of the one or more logical channels is below remaining time threshold; and no DSR has been triggered for the one or more logical channels.

10. The method of claim 1, the method further comprising:

cancelling the SR in case that the specific delay-critical data is transmitted.

11. The method of claim 1, wherein the one or more logical channels belong to a logical channel group.

12. A terminal comprising:

a transceiver;

a memory; and a controller coupled to the transceiver and the memory, wherein the controller is configured to cause the terminal to:

trigger a delay status report (DSR) for one or more logical channels;

trigger a scheduling request (SR) in case that uplink resource available for new transmission is not enough to accommodate a DSR medium access control (MAC) control element (CE) and its subheader as a result of logical channel prioritization;

transmit the SR based on an SR configuration;

start a prohibit timer for the SR; and stop the prohibit timer for the SR in case that a-specific delay-critical data is transmitted.

* * * * *